United States Patent
Stephenson et al.

(10) Patent No.: US 10,412,885 B2
(45) Date of Patent: Sep. 17, 2019

(54) ROTARY CUTTERBAR MODULE END CAP

(71) Applicant: DEERE & COMPANY, Moline, IL (US)

(72) Inventors: Roger Stephenson, Ottumwa, IA (US); Todd Aeschliman, Ottumwa, IA (US); Thomas Nichols, Eldon, IA (US)

(73) Assignee: DEERE & COMPANY, Moline, IL (US)

( * ) Notice: Subject to any disclaimer, the term of this patent is extended or adjusted under 35 U.S.C. 154(b) by 304 days.

(21) Appl. No.: 15/402,481

(22) Filed: Jan. 10, 2017

(65) Prior Publication Data

US 2017/0251597 A1      Sep. 7, 2017

Related U.S. Application Data

(60) Provisional application No. 62/303,434, filed on Mar. 4, 2016.

(51) Int. Cl.
| | |
|---|---|
| *A01D 34/66* | (2006.01) |
| *A01D 34/73* | (2006.01) |
| *A01D 101/00* | (2006.01) |

(52) U.S. Cl.
CPC ........... *A01D 34/665* (2013.01); *A01D 34/73* (2013.01); *A01D 2101/00* (2013.01)

(58) Field of Classification Search
CPC ...... A01D 34/66; A01D 34/73; A01D 101/00; A01D 34/665; A01D 34/664; A01D 34/668
See application file for complete search history.

(56) References Cited

U.S. PATENT DOCUMENTS

| | | | |
|---|---|---|---|
| 2,625,784 A | * | 1/1953 | Cadwallader ........ A01D 34/664 56/13.6 |
| 4,468,916 A | | 9/1984 | Vissers et al. |
| 4,476,666 A | | 10/1984 | van der Lely et al. |
| 4,840,019 A | | 6/1989 | Pingry |
| 4,947,629 A | | 8/1990 | Ermacora et al. |
| 4,986,060 A | | 1/1991 | Walters et al. |
| 5,012,635 A | | 5/1991 | Walters et al. |

(Continued)

FOREIGN PATENT DOCUMENTS

| | | |
|---|---|---|
| EP | 0060600 A1 | 9/1982 |
| EP | 0774202 A1 | 5/1997 |

OTHER PUBLICATIONS

European Patent Office; Extended European Search Report for European Patent Application No. 17159151.4, dated Jun. 6, 2017; 7 Pages: Munich, Germany.

*Primary Examiner* — Arpad Fabian-Kovacs
(74) *Attorney, Agent, or Firm* — Taft Stettinius & Hollister LLP; Stephen F. Rost

(57) ABSTRACT

A modular cutterbar assembly operably coupled to a work machine includes at least one module and an end cap coupled to the at least one module. The end cap includes an upper surface defined between a first end and a second end, and an inner cavity is defined in the first end of the end cap. The inner cavity is configured to substantially enclose a drive transfer mechanism. An aperture is defined in the upper surface, and a coupler arm is integrally formed with the second end of the end cap. The coupler arm is configured to be coupled to the work machine.

20 Claims, 24 Drawing Sheets

(56) References Cited

U.S. PATENT DOCUMENTS

| | | | | |
|---|---|---|---|---|
| 5,715,663 | A * | 2/1998 | Getz | A01D 34/665 56/136 |
| 5,784,866 | A | 7/1998 | Campbell et al. | |
| 5,809,757 | A | 9/1998 | McLean et al. | |
| 5,937,624 | A * | 8/1999 | McLean | A01D 34/665 56/13.6 |
| 7,536,846 | B1 * | 5/2009 | Pruitt | A01D 34/664 56/13.6 |
| 7,661,253 | B2 | 2/2010 | Pruitt et al. | |
| 7,730,703 | B1 | 6/2010 | Ehrhart et al. | |
| 7,832,189 | B1 | 11/2010 | Ehrhart et al. | |
| 9,717,175 | B2 * | 8/2017 | Fay, II | A01D 34/665 |
| 2009/0158699 | A1 * | 6/2009 | Pruitt | A01D 34/665 56/6 |
| 2011/0078988 | A1 * | 4/2011 | Roberge | A01D 34/665 56/13.6 |
| 2015/0305236 | A1 | 10/2015 | Fay, II et al. | |
| 2016/0212935 | A1 * | 7/2016 | Nafziger | A01D 41/127 |

\* cited by examiner

ROTARY CUTTERBAR MODULE END CAP

RELATED APPLICATIONS

The present application claims the benefit of U.S. Provisional Application Ser. No. 62/303,434, filed Mar. 4, 2016, the disclosure of which is hereby incorporated by reference in its entirety.

FIELD OF THE DISCLOSURE

The present disclosure relates to a rotary mower configured to cut crop material, and more particularly to components of a rotary cutterbar.

BACKGROUND

Agricultural equipment, such as a tractor or a self-propelled windrower, includes a prime mover which generates power to perform work. In the case of a tractor, for instance, the prime mover is often a diesel engine that generates power from a supply of diesel fuel. The diesel engine drives a transmission which moves wheels, treads, or tracks to propel the tractor across an underlying surface. In addition to providing power to wheels through a transmission, tractors often include a power takeoff (PTO) which includes a shaft coupled to the transmission and driven by the engine.

In different embodiments, a mower or mower conditioner is a separable machine which is configured to be attached to and detached from a tractor or other work machine, which either pushes the mower or pulls the mower. In the separable mower, the mower is removably coupled to the tractor and is readily moved from one tractor to another if desired. In these embodiments, the mower is powered by the PTO of the tractor or a hydraulic motor system thereof.

SUMMARY

One embodiment may be a modular cutterbar assembly having a direction of travel along an underlying surface, comprising a first end cap having a first surface and defining an inner cavity; a first aperture defined through the first surface into the inner cavity; a first disk hub assembly positioned through the first aperture and configured to rotate a first cutting disk; a first coupler arm integrally formed with the first end cap; and a first joint surface integrally formed in the first end cap; a first module coupled to the first end cap at the first joint; wherein, the first end cap is one integral material configured to couple the first disk hub assembly thereto.

One example of the modular cutterbar assembly may have a first tab defined in the first module; a second tab defined in the first end cap; and a disk guard coupled to both the first tab and the second tab. In another example, the first coupler arm may extend away from the harvest direction. In a further example, the first disk hub assembly is coupled only to the first end cap. In yet a further example, the first module may be coupled to the end cap at a first coupler mount at a front edge and at a second coupler mount at a rear edge. Further, the first module may be coupled to the end cap at a third coupler mount extending from the first surface and positioned between the first and second coupler mounts.

In another embodiment, the modular cutterbar assembly may have a second end cap having a first surface and defining an inner cavity; a second aperture defined through the first surface into the inner cavity; a second disk hub assembly positioned through the second aperture and configured to rotate a second cutting disk; a second coupler arm integrally formed with the second end cap; a second joint surface integrally formed in the second end cap; and a second module coupled to the second end cap at the second joint; wherein, the second end cap is one integral material configured to couple the second disk hub assembly thereto. Further, one or more additional modules may be coupled between the first module and the second module and the inner cavity may be fluidly sealed between the first and second end cap and the modules. Further, the first and second end caps may be coupled to a work machine. In one example, a drive transfer mechanism may be positioned within the inner cavity.

In a further embodiment of the present disclosure, a cutterbar assembly includes a plurality of modules wherein adjacent modules are coupled to one another along a cutterbar axis; a first end cap coupled to a first module of the plurality of modules along the cutterbar axis, the first end cap including a first inner cavity defined by the first end cap, the first inner cavity configured to substantially enclose a drive transfer mechanism; a first aperture defined in an upper surface of the first end cap; and a first coupler arm integrally formed with the first end cap, the first coupler arm configured to be coupled to the work machine; a second end cap coupled to a second module of the plurality of modules along the cutterbar axis, the second end cap including a second inner cavity defined by the second end cap, the second inner cavity configured to substantially enclose a drive transfer mechanism; a second aperture defined in an upper surface of the second end cap; and a second coupler arm integrally formed with the second end cap, the second coupler arm configured to be coupled to the work machine.

In one example of this embodiment, the first end cap is coupled to the first module along a first joint, and the second end cap is coupled to the second module along a second joint. In a second example, during operation, the first end cap, second end cap and plurality of modules move in a harvest direction, and the first and second joints are angled relative to the harvest direction. In a third example, a first disk hub assembly disposed in the first aperture and configured to rotate a first cutting disk; and a second disk hub assembly disposed in the second aperture and configured to rotate a second cutting disk. In a fourth example, the first end cap forms a first tab and the second end cap forms a second tab, the first and second tabs configured to be coupled to a disk guard. In another example, the first module is coupled to the first end cap at a first coupler location along a front edge, at a second coupler location along a rear edge, and at a third coupler location disposed between the first and second coupler locations.

In yet a further embodiment, a tractor assembly includes a tractor having a chassis, at least one ground engaging mechanism coupled to the chassis, and a prime mover coupled to the chassis for generating power to drive the at least one ground engaging mechanism; a modular cutterbar assembly comprising a plurality of modules disposed along a cutterbar axis, the modular cutterbar assembly including at least a first module; a first end cap coupled to the first module, the first end cap including a first inner cavity defined by the first end cap, the first inner cavity configured to substantially enclose a drive transfer mechanism; a first aperture defined in an upper surface of the first end cap; and a first coupler arm integrally formed with the first end cap, the first coupler arm configured to be coupled to the work machine; a second end cap coupled to the first module opposite the first end cap, the second end cap including a second inner cavity defined by the second end cap, the second inner cavity configured to substantially enclose a drive transfer mechanism; a second aperture defined in an upper surface of the second end cap; and a second coupler arm integrally formed with the second end cap, the second coupler arm configured to be coupled to the work machine.

In one example of this embodiment, the first end cap is coupled to the first module along a first joint, and the second end cap is coupled to the first module along a second joint. In another example, the first end cap forms a first tab, the second end cap forms a second tab, and the first module forms a third tab, where the first, second, and third tabs are configured to be coupled to a disk guard.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 10b is a perspective view of a second end cap of the modular cutterbar assembly of FIG. 10a;

FIG. 10c is a different perspective view of the second end cap of the modular cutterbar assembly of FIG. 10a;

FIG. 11a is a partial section view of the modular cutterbar assembly of FIG. 10a;

FIG. 11b is an expanded partial section view of FIG. 11a;

FIG. 11c is a partial exploded view of the modular cutterbar assembly of FIG. 10a;

FIG. 12 is an isolated perspective view of one module from the modular cutterbar assembly of FIG. 10a;

FIG. 13 is a section view of the modular cutterbar assembly of FIG. 10a;

FIG. 14 is a partial rear view of the cutterbar assembly of FIG. 10a;

FIG. 16b is an expanded section view of FIG. 16a;

FIG. 20 is another embodiment of a section view of the modular cutterbar assembly of FIG. 10a.

Corresponding reference numerals are used to indicate corresponding parts throughout the several views.

DETAILED DESCRIPTION

Figure 1:
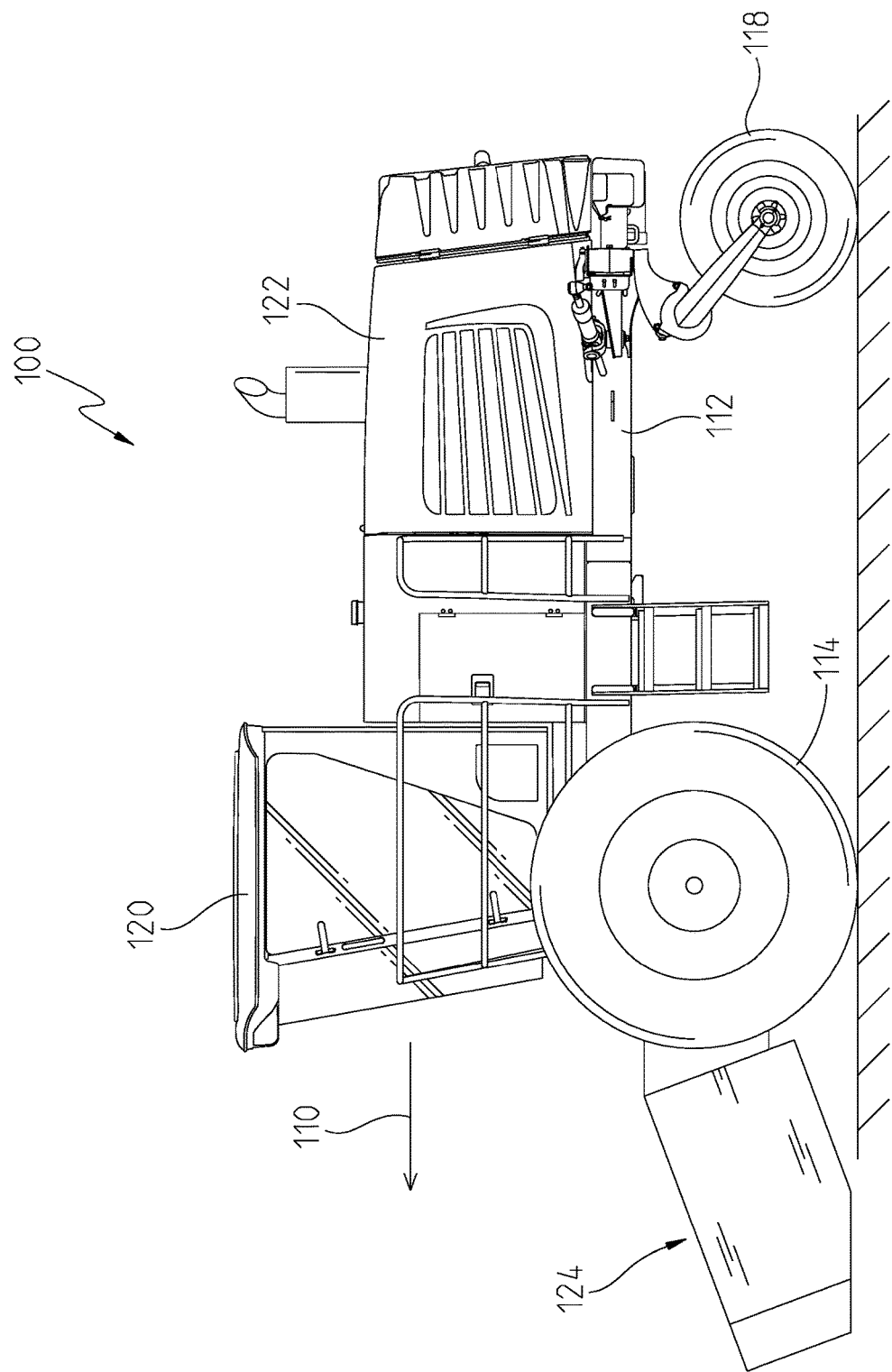
FIG. 1 is a side elevational view of a windrower including a tractor coupled to a mower conditioner.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In one embodiment, a rotary cutterbar assembly is used as a cutting element for the mower. The rotary cutterbar assembly is an elongated housing that contains a drive assembly to distribute rotational torque provided by the prime mover to a plurality of cutting disks. In turn, the cutting disks rotate knives coupled thereto to sever any underlying crop from the ground. Typically, the cutterbar is positioned to closely follow the underlying surface. In this configuration, the cutterbar often contacts any material that does not closely align with the underlying surface. For example, rocks, dirt piles, stumps, or the like may protrude from the underlying surface and contact the cutterbar as it travels thereover.

To address the potential contact between the cutterbar and the underlying surface, disk guards are positioned along the cutterbar at a location that corresponds with each of the rotating disks. The disk guards are sized to absorb the force applied to the cutterbar when it contacts underlying objects. In addition to substantially absorbing the impact, the disk guards also deflect the cutterbar away from the underlying object so the cutterbar can travel thereover. Accordingly, the disk guard has sufficient structural integrity to withstand contact with an underlying object and to raise the cutterbar thereover.

Cutterbar assemblies are also typically formed from a plurality of modules coupled to one another. Each module contains a portion of the drive assembly and cutting disk and a different number of modules is used to accommodate cutterbar assemblies having different lengths. The cutterbar assemblies are often supported either through being cantilevered from one side of the cutterbar assembly or through supports on both sides of the cutterbar assembly. In one embodiment, the modules within the cutterbar assembly are coupled to one another to avoid substantial deflection of the cutterbar assembly during use. Further, the modules are coupled to one another to absorb an impact to the disk guard from an underlying object as described above. Often the modules are coupled to one another at a front end and a rear end and additionally coupled to a beam that spans the entire width of the cutterbar assembly to provide supplemental structural support.

Further, each cutting disk may be rotatably coupled to the cutterbar assembly through a bearing positioned about a cutting disk shaft located under the cutting disk. As the mower executes the cutting function while the tractor moves along the underlying surface, debris frequently becomes positioned proximate to, or within, the bearing. In some instances, string-like debris may become wrapped around the cutting disk shaft and provide a resistance to the desired rotation of the cutting disk.

FIG. 1 is a side elevational view of a self-propelled crop harvesting machine or other work machine 100 operable to cut and collect standing crop in a field, condition the cut crop as it moves through a mower conditioner machine to improve its drying characteristics, and then return the cut and conditioned crop material to the field in a windrow or swath. The crop harvesting machine is also known as a mower, mower conditioner, or a windrower. The crop harvesting machine 100 moves along the field in a harvesting direction or direction of travel 110. The crop harvesting machine 100 includes a main frame 112 supported on driven right and left front wheels, of which only the left front wheel 114 (with respect to the operator) is shown and on right and left caster mounted rear wheels, of which only a left rear wheel 118 is shown. However, in one embodiment tracks may be used instead of wheels and this disclosure is not limited to any particular type of ground engaging mechanism. Carried on a forward end region of the frame 112 is a cab 120. Mounted on the frame 112 behind the cab 120 is a housing 122 within which is located a prime mover (not shown), such as an internal combustion engine.

A mower 124 is coupled to and supported by the forward end of the frame 112. Operator controls (not shown) are provided in the cab 120 for operation of the crop harvesting machine 100, including the attached mower 124. The harvesting header, in one embodiment, includes one or more ground engaging devices, such as one or more skid shoes or wheels (not shown), to support the mower 124 during movement across a field. In one embodiment, the harvesting header does not include a traction drive. Instead, all of its power may come from the windrower traction unit or the tractor.

While a harvesting header is described above, this disclosure applies to other types of headers or mowers as well. In one embodiment, the mower does not have the conditioner described above. Further, while the mower 124 is shown and described mounted towards the forward end of the frame 112, this disclosure includes mowers mounted to any portion of the work machine 100. More specifically, the mower may be mounted off to one side of the frame 112 instead of towards the forward end. Further still, a work machine 100 may have a rear mount hitch (not shown) for coupling to the mower 124. In one embodiment, a PTO may provide power to the mower 124 to cut the underlying crop. In other embodiments, a hydraulic or electric motor may be coupled to the mower 124 to provide power thereto. The hydraulic or electric power may be provided to the mower by the prime mover of the work machine 100. This disclosure is inclusive of many different mounting locations and drive systems for the mower 124. Accordingly, no particular mounting location or drive system is necessary.

Figure 2:
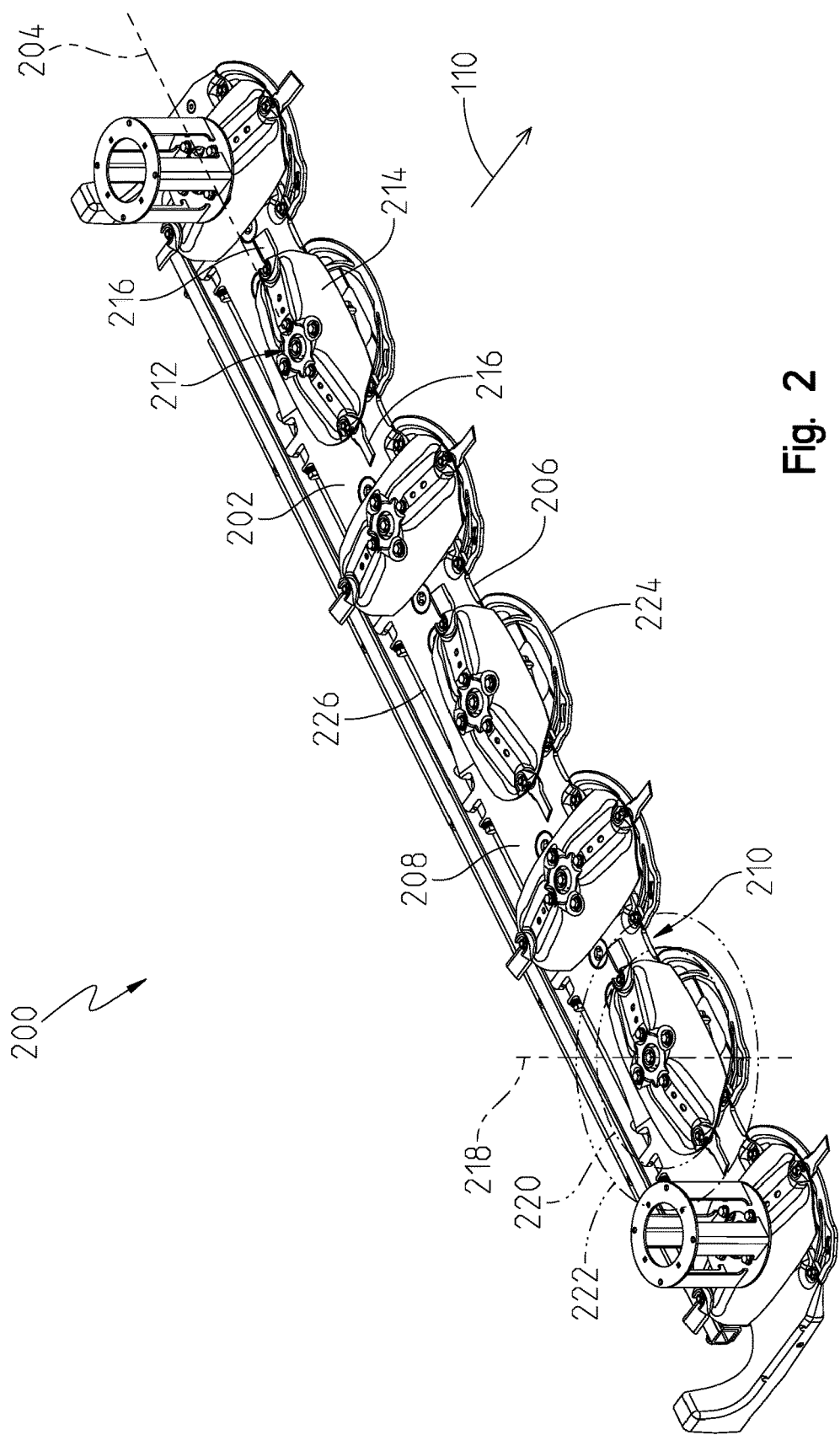
FIG. 2 is an isolated perspective view of a cutterbar assembly.

Referring now to FIG. 2, a cutterbar assembly 200 having a housing 202 with a front edge 206, a rear edge 226, a first surface 208 and a second surface 210 is shown. The cutterbar assembly 200 may be a rotary cutterbar positioned within the mower 124 and able to cut underlying crop as the work machine 100 moves in the harvesting direction 110. More specifically, the housing 202 may define a cutterbar axis 204. The cutterbar axis 204 can be substantially perpendicular to the harvesting direction 110 to expose a front edge 206 of the cutterbar assembly 200 to the underlying crop as the work machine 100 travels in the harvest direction 110.

Figure 11A:
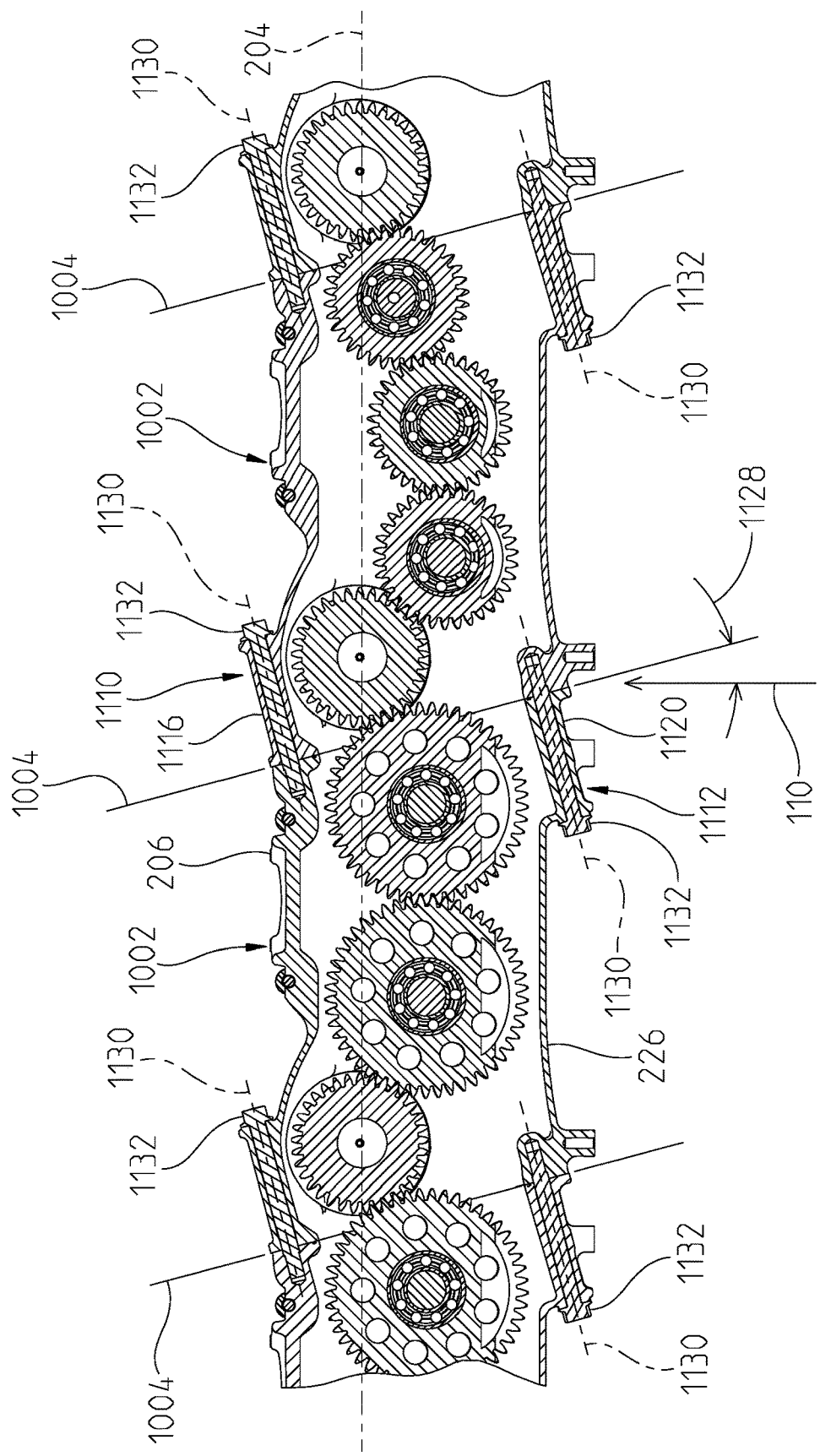
Figure 11B:
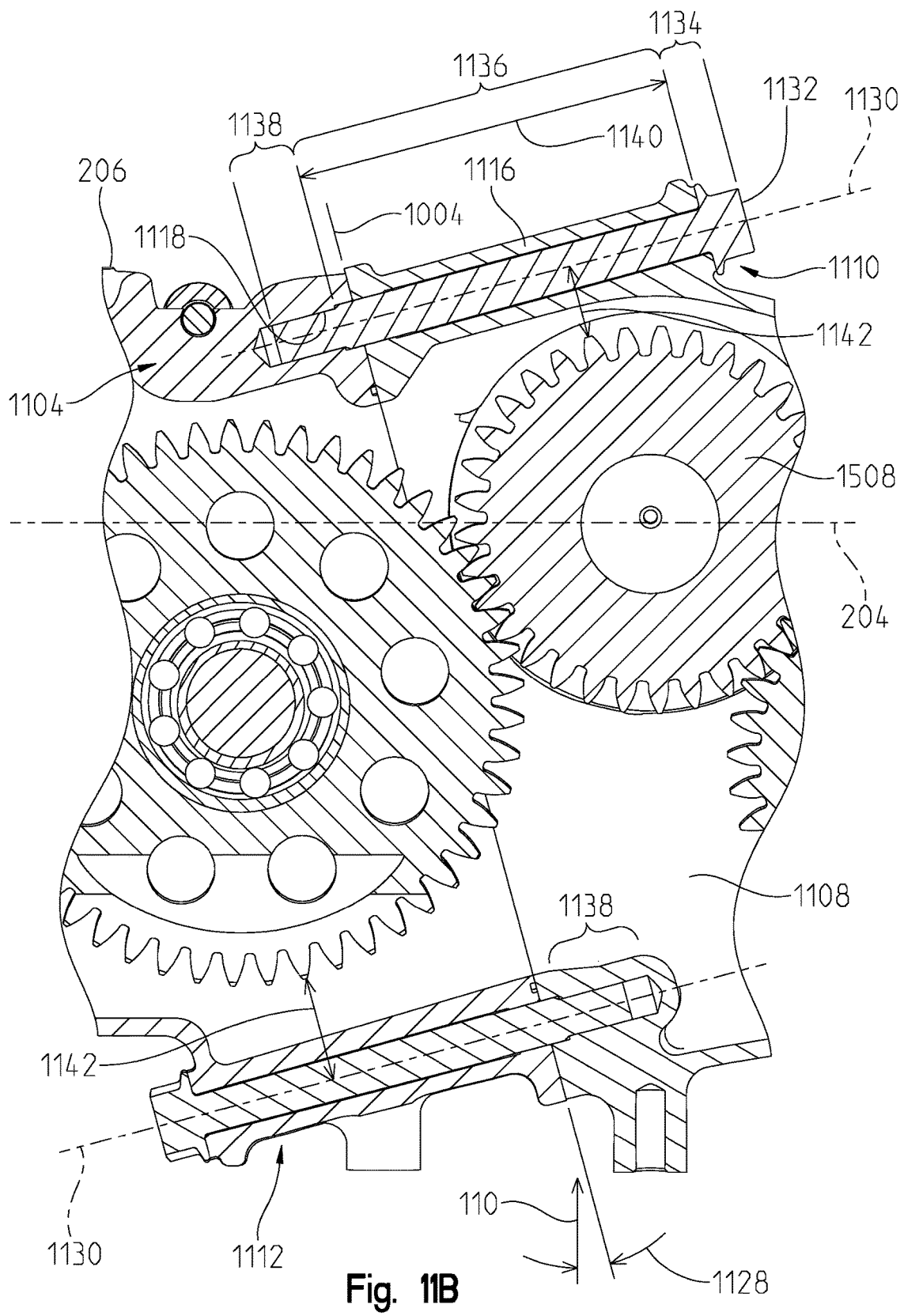
Figure 11C:
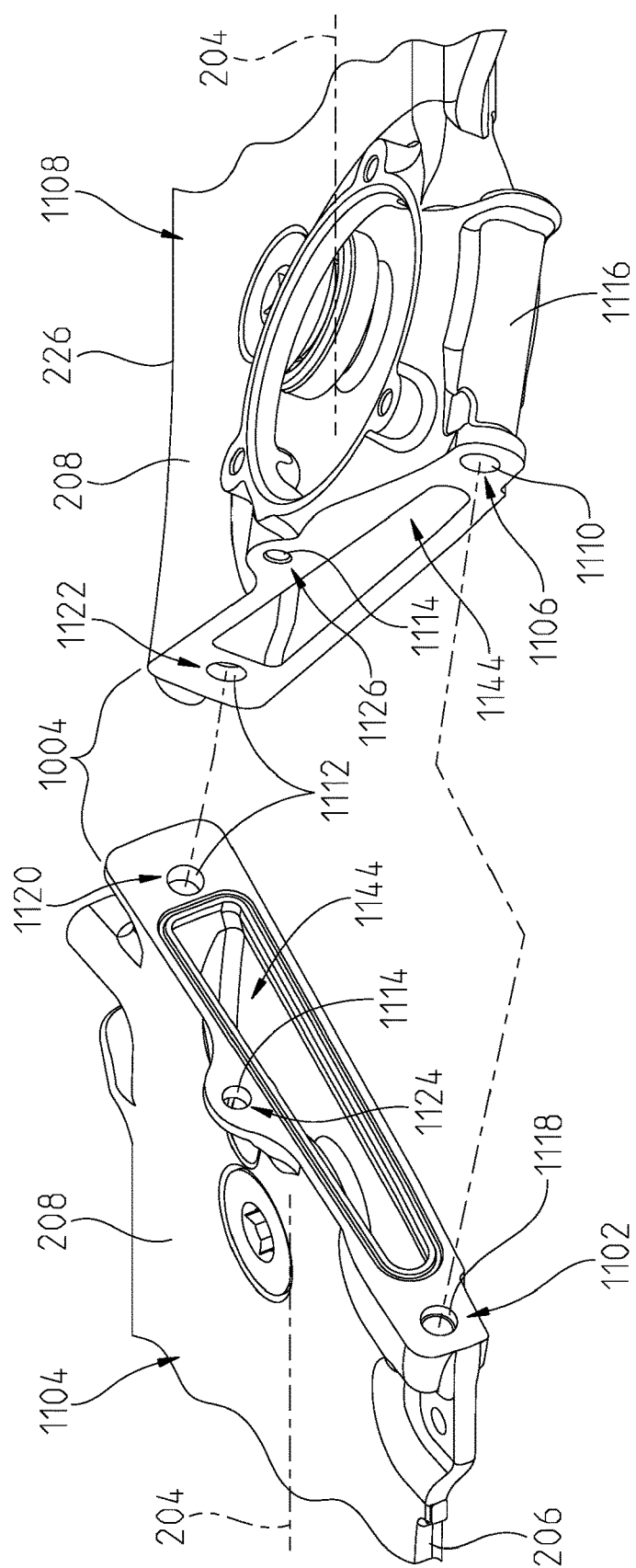

The housing 202 may define an inner cavity 1144 (see FIG. 11c). The inner cavity 1144 may provide for a location for a drive transfer mechanism (not shown in FIG. 2) to be positioned within the cutterbar assembly 200. The drive transfer mechanism may utilize any known method for transferring torque. In one embodiment, a plurality of gears may be positioned within the inner cavity 1144 and coupled to one another to transfer torque throughout the drive transfer mechanism. In another embodiment, belts and pulleys may be used. In yet another embodiment, drive shafts may be rotatably coupled to one another to create the drive transfer mechanism. A person having skill in the art will understand the many ways to transfer torque and this disclosure is not limited to any particular type of drive transfer mechanism disposed within the cavity 1144.

The first surface 208 may be defined along an upper portion of the cutterbar assembly 200 relative to the underlying surface. Further, the first surface 208 may provide a plurality of apertures 1020 (see FIGS. 10b, 12, 15) spaced along the cutterbar axis 204. The apertures 1020 may allow one or more disk hub assemblies 212 to be coupled to the drive transfer mechanism.

The disk hub assemblies 212 may have a cutting disk 214 coupled thereto. More specifically, the drive transfer mechanism may transfer torque to the disk hub assembly 212 and rotate the cutting disk 214 that is coupled thereto. The cutting disk 214 may have at least one knife 216 coupled thereto at a radially outer portion of the cutting disk 214. The knife 216 may be pivotally coupled to the cutting disk 214 on one end and define a cutting surface at the other. The rotation of the cutting disk 214 may be sufficient to allow each knife 216 to rotate about the cutting disk 214 with sufficient speed to cut any crop that may contact the cutting surface of the knife 216.

In one non-exclusive embodiment, the disk hub assembly 212 may define a disk axis 218 that is substantially perpendicular to the cutterbar axis 204. The cutting disk 214 may define a disk radius 220 about the disk axis 218 and the radially outer portion of the knife 216 may define a knife radius 222 as it rotates about the disk axis 218. In one non-exclusive example, the disk radius 220 is less than the knife radius 222.

At least one disk guard 224 is also shown in FIG. 2. The disk guard 224 may be coupled to the housing 202 towards the front edge 206 and extend away from the front edge 206 in the harvest direction 110. The disk guard 224 may also be positioned along the cutterbar assembly 200 in alignment with the respective disk hub assembly 212.

In one embodiment, the disk guard 224 may be positioned circumferentially about a portion of the disk axis 218 at a radius slightly greater than the disk radius 220 but less than the knife radius 222. In this embodiment, the cutterbar assembly 200 may contact an underlying object such as a stump, a rock, a stick, or the like. If the cutterbar assembly 200 encounters the underlying object as it travels in the harvest direction 110, the disk guard 224 may contact the object before the cutting disk 214. As the disk guard 224 contacts the object, the disk guard 224 may either force the cutterbar assembly 200 away from the object, or force the object away from the cutterbar assembly 200, thereby protecting the cutting disk 214 from being damaged.

The disk guard 224 may also be positioned to allow the radially outer portion of a respective knife 216 to extend past the disk guard 224 in the harvest direction 110 as the knife 216 rotates with the cutting disk 214. In this configuration, the knife 216 may contact and cut any crop positioned within the knife radius 222 before the disk guard 224 contacts the crop. In one embodiment, if the cutterbar assembly 200 contacts an object in the underlying surface as it travels in the harvest direction 110, the respective knife 216 may contact the object before the disk guard 224 contacts the object. When this happens, the knife 216 may pivot relative to the cutting disk 214 to avoid substantial damage. As the cutterbar assembly 200 continues to move in the harvest direction 110 towards the object, the disk guard 224 may contact the object before the rotating cutting disk 214. Accordingly, as the cutterbar assembly 200 moves in the harvest direction 110 towards the object, the knife 116 may first contact, and rotate away from, the object. Then the disk guard 224 may deflect the cutterbar assembly 200 away from the object, or vice versa, to protect the cutting disk 214.

While the radius of the disk guard 224 has been described as slightly greater than the disk radius 220, this disclosure is not limited to such. More specifically, in one embodiment the disk guard 224 radius may be the same as the disk radius 220. In yet another embodiment the disk guard 224 radius may be less than the disk radius 220. Further still, the disk guard 224 is not limited to having a radius at all. For instance, the disk guard 224 may not be defined along a radius but have a different shape, such as a square, rectangle, triangle, trapezoid, oval or the like. In yet another non-exclusive example, the disk guard 224 may have a radius similar to the disk radius 220 but have an axis offset from the disk axis 218. Accordingly, this disclosure considers many different shapes for the disk guard 224 and is not limited to any particular one.

Figure 3:
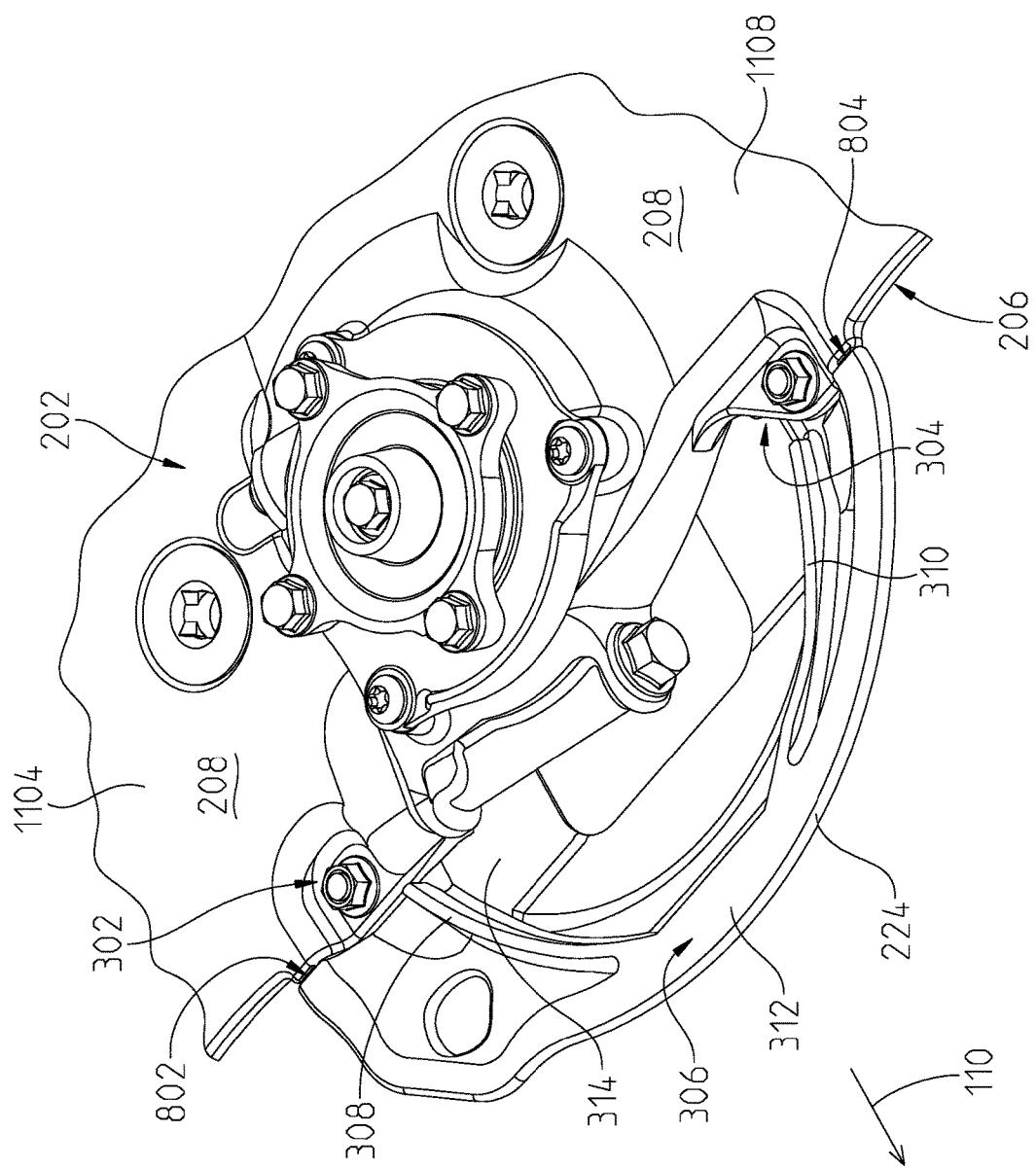
FIG. 3 is a partial top-side perspective view of a disk guard coupled to the cutterbar assembly with a cutting disk removed.

Now referring to FIG. 3, a partial view of the cutterbar assembly 200 is shown with the cutting disk 214 removed. More specifically, a first tab 302 and a second tab 304 are shown along the front edge 206 of the housing 202. The first tab 302 may be a first portion or location of the housing 202 where the disk guard 224 can be coupled to the housing 202. Similarly, the second tab 304 may be a second portion or location of the housing 202 where the disk guard 224 can be coupled to the housing 202. In one non-exclusive embodiment, the first and second tabs 302, 304 may define a tab plane 502 (see FIG. 5) that extends between the first and second surface 208, 210 (also shown in FIG. 5).

The disk guard 224 may be coupled to the housing 202 at both the first and second tabs 302, 304 and extend toward the harvest direction 110. The disk guard 224 may have a substantially arc-shaped outer lip 306 that extends from a first receiver 802 (see FIG. 8) that is proximate to the first tab 302 to a second receiver 804 (see FIG. 8) that is proximate to the second tab 304.

In one embodiment, the lip 306 may define a lip plane (not specifically shown). The lip plane may be substantially parallel to the first surface 208. Further, in one embodiment the lip plane may be coplanar with a plane defined by the first surface 208. The lip 306 may be spaced from the cutting disk 214 to substantially protect the cutting disk 214 from underlying objects without contacting the cutting disk 214 as it rotates as described above. In another embodiment, the lip plane may be angularly offset from the first surface 208. In this embodiment, the lip plane may angle away from the cutting disk 214. By angling away from the cutting disk, the disk guard 224 may deflect without coming into contact with the cutting disk 214.

The disk guard 224 may also define a first rib 308 that extends from an area near the first tab 302 towards a nose section 312 of the outer lip 306. Similarly, the disk guard may define a second rib 310 that extends from an area near the second tab 304 towards the nose section 312. The first rib 308 and the second rib 310 may be extensions from the surface of the disk guard 224 towards the lip plane.

Further, the disk guard 224 may have a base section 314 that is positioned along a portion of the housing 202. That is to say, the base section 314 may have a bottom surface that is coplanar or slightly outward of the housing 202. The base section 314 may be sized and positioned to allow the cutterbar assembly 200 to slide along the underlying surface. More specifically, the base section 314 may be co-planar with, or extend away from, the housing 202 to reduce any leading edges that may get caught on debris along the underlying surface as the work machine travels in the harvest direction 110.

Figure 19:
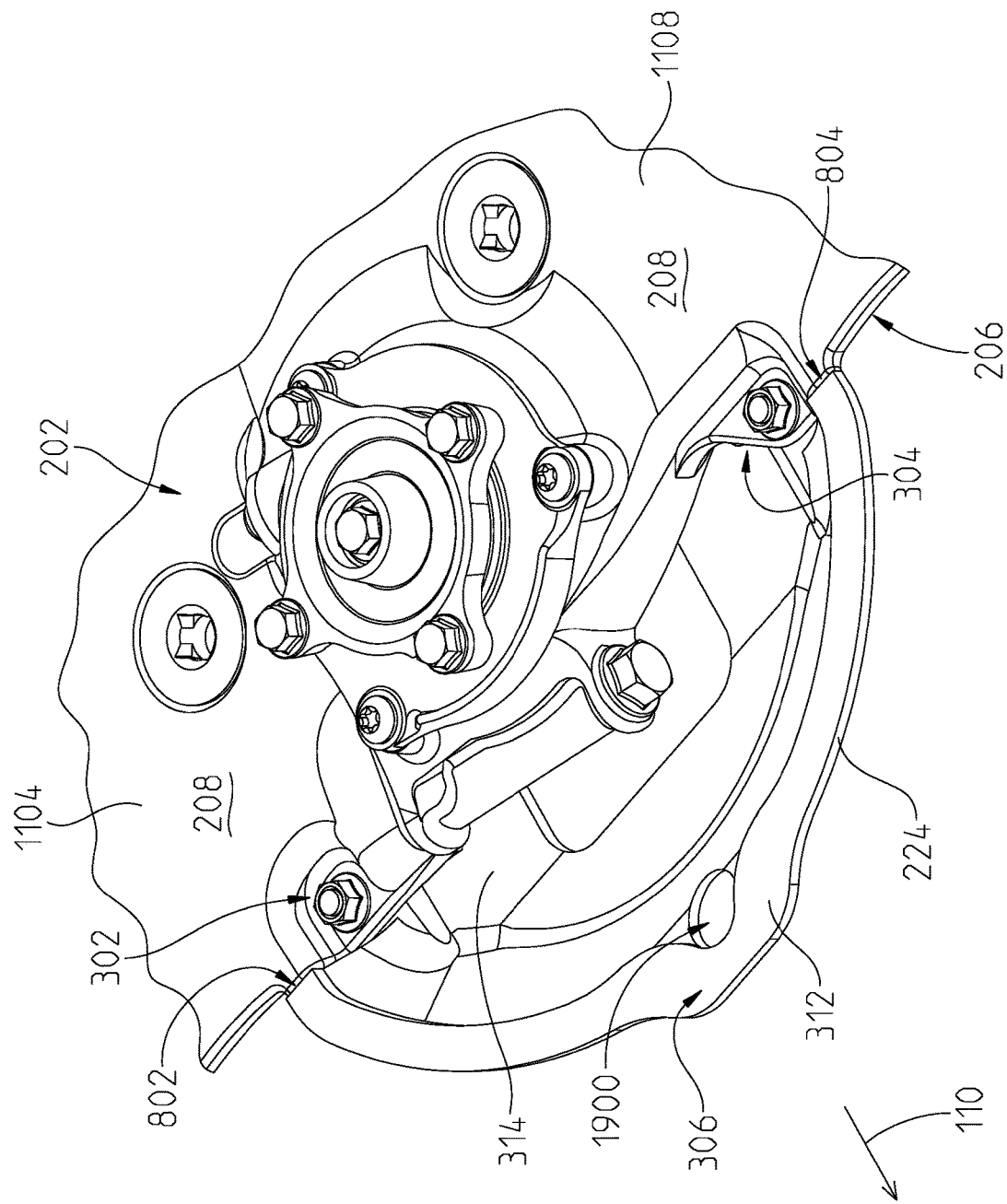
FIG. 19 is another embodiment of a partial top-side perspective view of a disk guard coupled to the cutterbar assembly with a cutting disk removed.

A different embodiment of the disk guard 224 is shown in FIG. 19. Here, an opening or through-hole 1900 is defined near a central portion of the disk guard. The opening or through-hole 1900 provides access for changing one or more knives (not shown). This opening or through-hole is defined along a direction of travel 110, as shown in FIG. 19. Moreover, to provide additional support in this portion of the disk guard, the outer lip 306 protrudes outwardly in the direction of travel 110 to form the nose section 312. The nose section 312 is more pronounced in FIG. 19 compared to FIG. 3.

Figure 4:
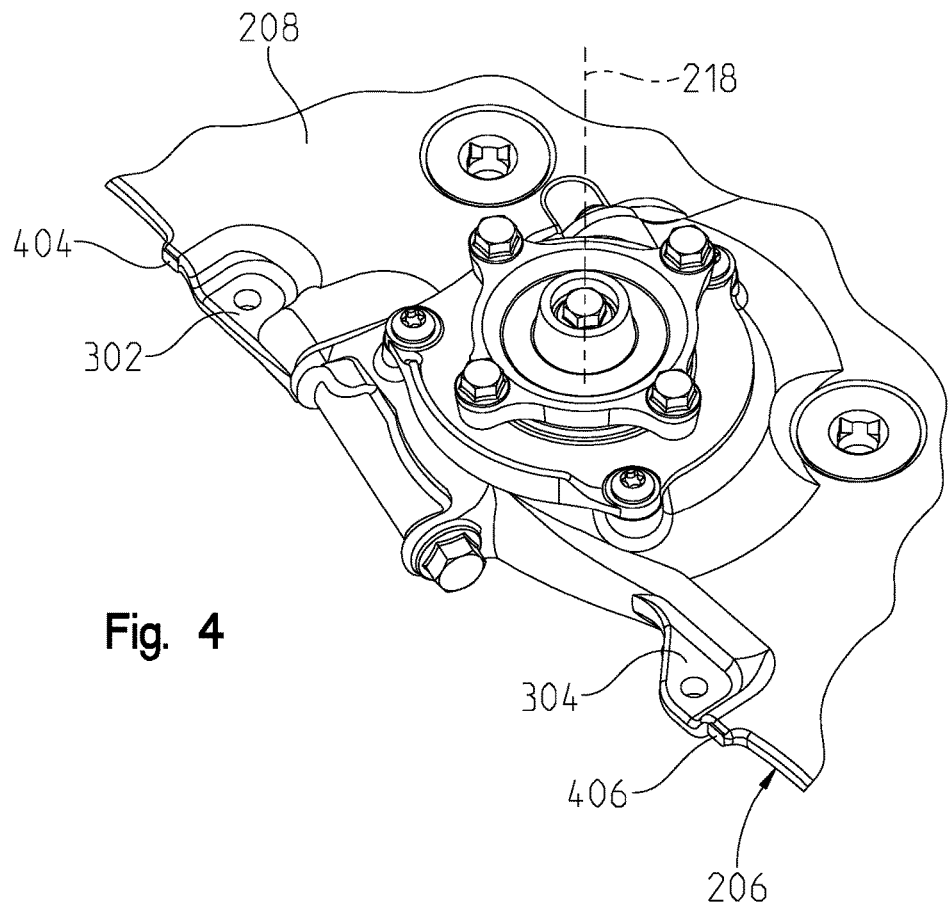
FIG. 4 is a partial top-side perspective view of the embodiment of FIG. 3 with the disk guard removed.

Referring now to FIG. 4, a partial view of the cutterbar assembly 200 is shown with the cutting disk 214 and the disk guard 224 removed. More specifically shown in FIG. 4 are a first stop surface 404 and a second stop surface 406. The first stop surface 404 may be positioned along the front edge 206 spaced from the first tab 302 relative to the disk axis 218. Similarly, the second stop surface 406 may be positioned spaced from the second tab 304 relative to the disk axis 218. Further, both the first and second stop surface 404, 406 may be positioned offset from the tab plane 502 towards the first surface 208, i.e., the first and second stop surfaces may be disposed at a location above the tab plane 502 as shown in FIG. 5.

Figure 5:
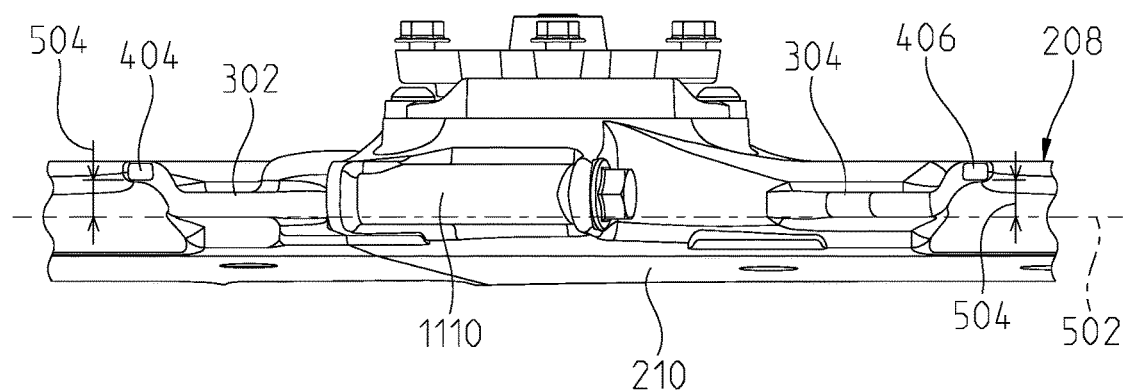
FIG. 5 is an elevated perspective view of the cutterbar assembly with the disk guard removed.

A cross-section of the tab plane 502 is shown in FIG. 5. More specifically, the offset spacing of the first and second stop surface 404, 406 is more clearly shown. In one non-limiting example, the first and second stop surface 404, 406 may be offset from the tab plane 502 by an offset distance 504 that allows a portion of the stop surfaces 404, 406 to be aligned with the top surface 208.

Figure 6:
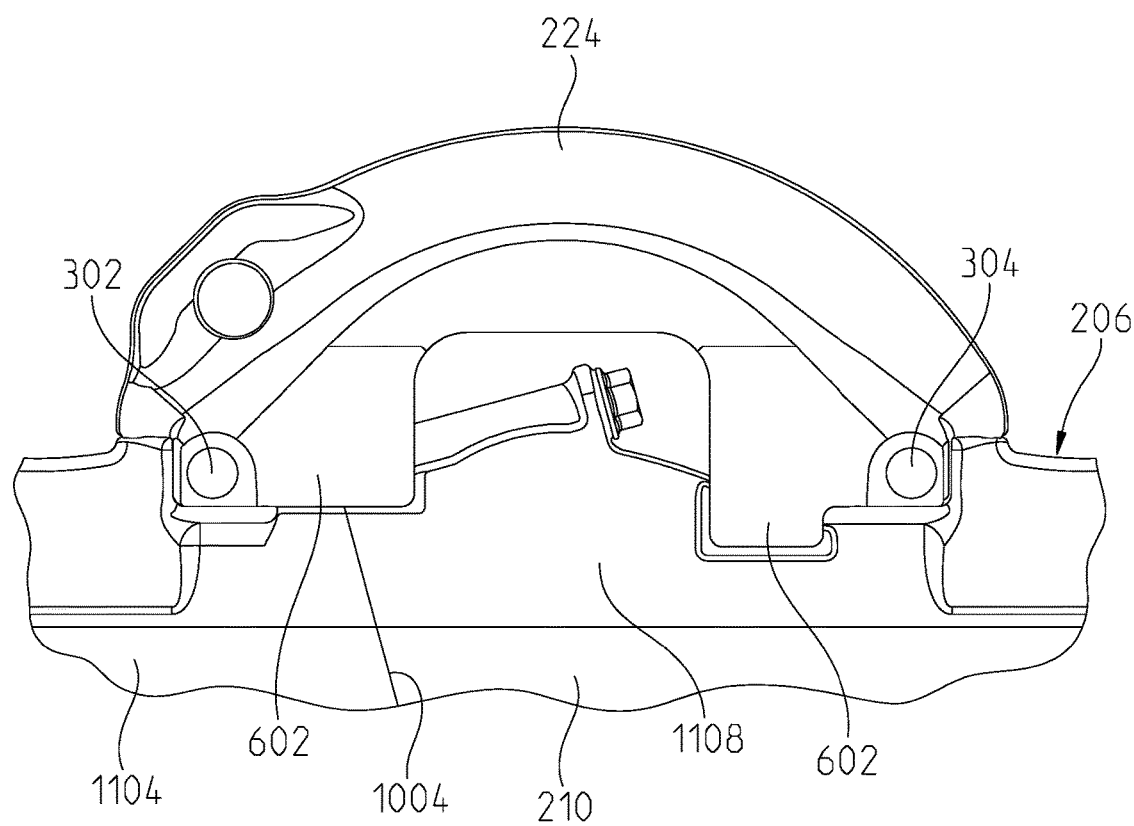
FIG. 6 is bottom section view of the embodiment of FIG. 3.

Now referring to FIG. 6, an extension 602 of the disk guard 224 is shown. In one non-exclusive embodiment, there may be more than one extension 602. The extension 602 may be positioned along a portion of the front edge 206 between the first tab 302 and the second tab 304. Further, in one embodiment the extension 602 may extend from the front edge 206 toward the rear edge 226 adjacent to a portion of the housing 202. In another embodiment, the extension 602 may extend between the first tab 302 and the second tab 304 along the housing 202 and the front edge 206. Further, in one non-limiting example, the extension 602 may assist in properly aligning the disk guard 224 with the housing 202.

Figure 7:
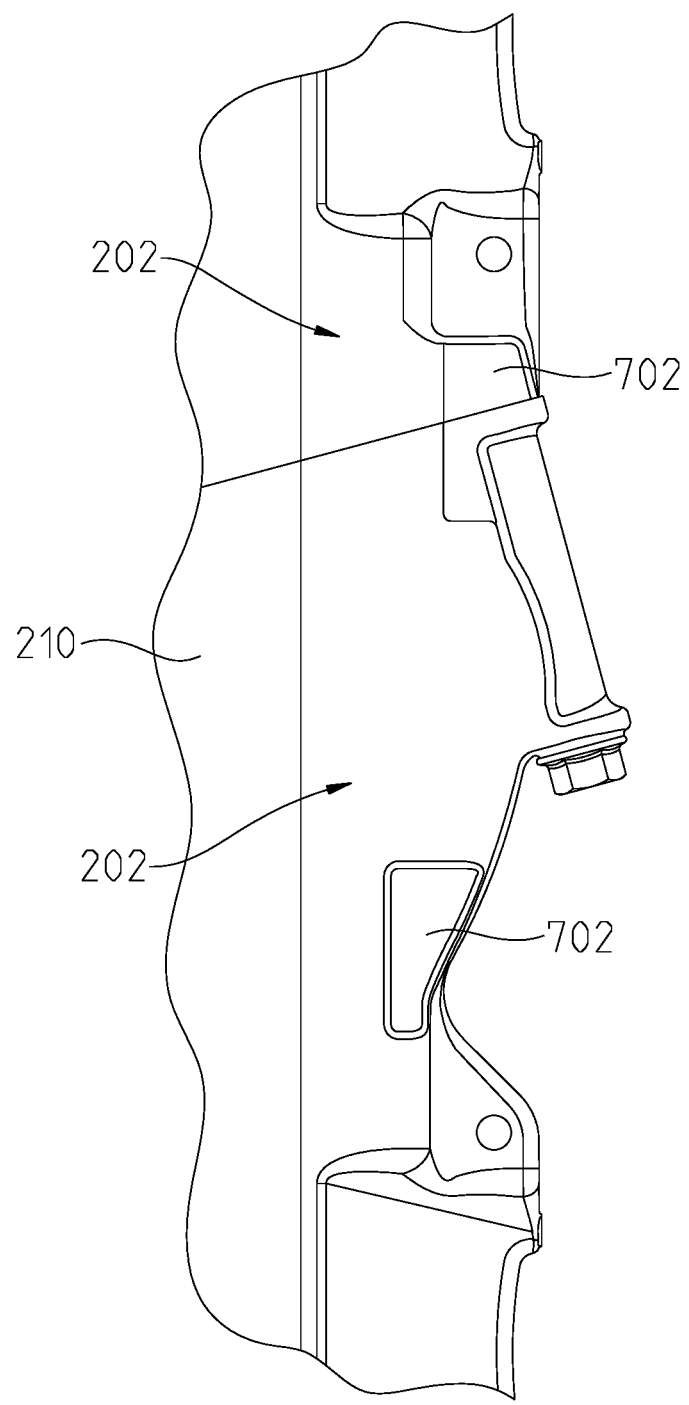
FIG. 7 is a bottom partial section view of the cutterbar assembly with the disk guard removed.

To accommodate the extension 602, the housing 202 may define at least one indentation 702 as shown in FIG. 7. The indentation 702 may be positioned to correspond with the respective extension 602. In this configuration, the indentation 702 may be sufficiently deep into an outer surface of the housing 202 to provide for a substantially planar or otherwise smooth transition between an outer surface of the disk guard 224 and the outer surface of the housing 202. In other words, the indentation 702 may be as deep as the respective extension 602 is thick.

In one embodiment, the extension 602 or other portion of the disk guard 224 may extend past the outer surface of the housing 202. In this embodiment, the disk guard 224 may be the first portion of the cutterbar assembly 200 to contact the underlying surface. The disk guard 224 may be sized to slide along the underlying surface while substantially restricting the other components of the cutterbar assembly 200 from coming into contact with the underlying surface. In other words, the respective disk guards 224 may be configured to be the main contact point between the cutterbar assembly 200 and the underlying surface. Accordingly, if the housing 202 or disk guard 224 contact the underlying surface while the cutterbar assembly 200 is travelling in the harvest direction 110, the extension 602 positioned within the indentation 702 may allow the cutterbar 200 to smoothly travel along the underlying surface.

Figure 8:
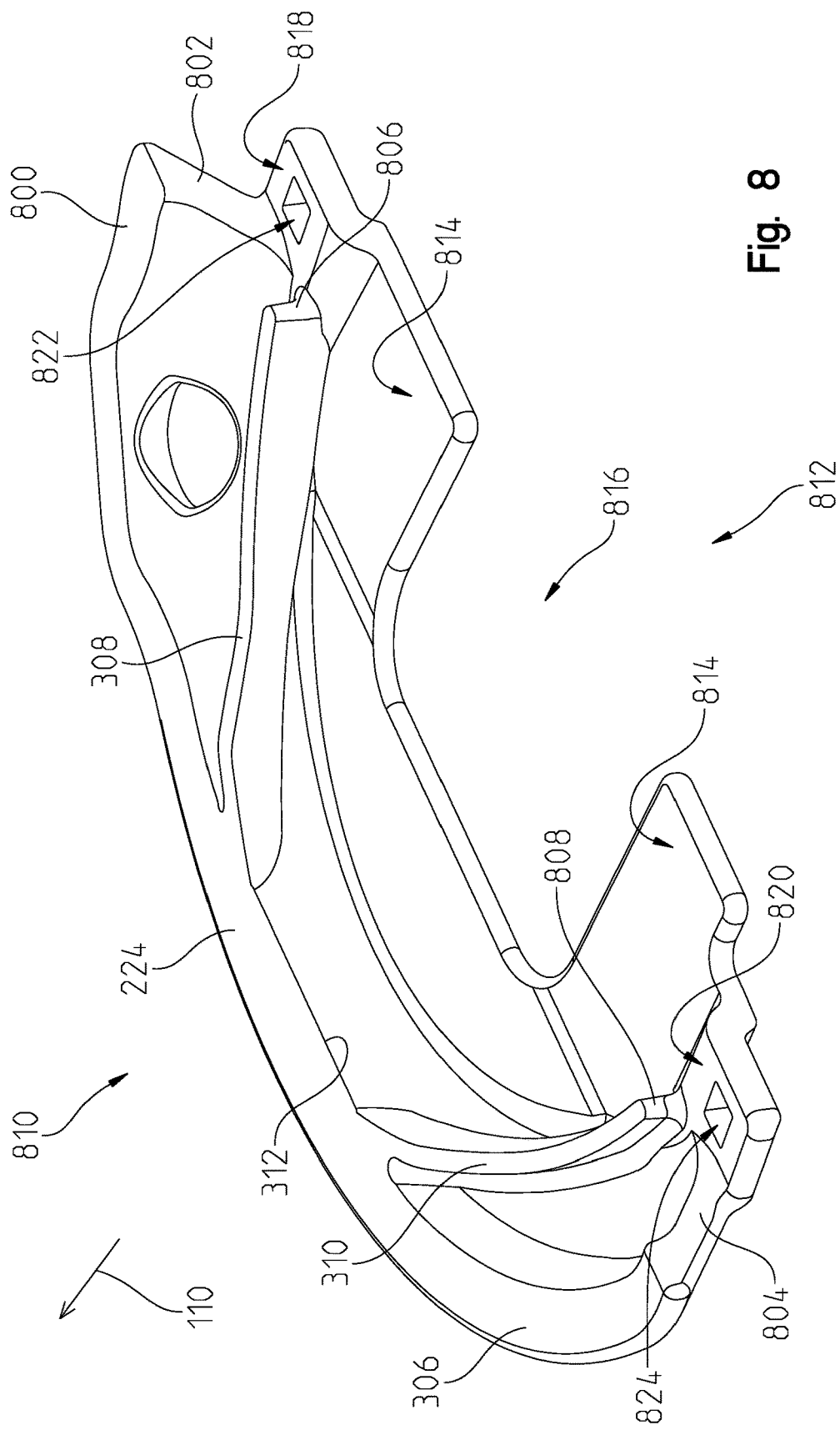
FIG. 8 is an isolated perspective view of the disk guard removed from the cutterbar assembly.

Now referring to FIG. 8, an isolated perspective view of the disk guard 224 is shown. More specifically, the first receiver 802 and the second receiver 804 are shown at the terminating ends of the outer lip 306. The first and second receivers 802, 804 may be surfaces defined by the disk guard 224 and positioned to be adjacent to the respective first and second stop surfaces 404, 406 when the disk guard 224 is coupled to the cutterbar 200. In other words, the first and second receivers 802, 804 may each be a substantially planar surface of the outer lip 306 that is adjacent to the respective first and second stop surface 404, 406. In the coupled position, each receiver surface may be spaced from the respective stop surface. Contact between the receiver surface and stop surface may be initiated only when the disk guard 224 deflects upon contact with an underlying object. In an alternative embodiment, the first and second receiver surfaces 802, 804 may be in direct contact when the disk guard 224 is coupled to the housing. In this alternative embodiment, however, there may be limited movement of the disk guard 224 as it deflects upon contact with an underlying object.

In one non-limiting example, coupling the disk guard 224 to the respective tabs 302, 304 may substantially inhibit movement of the disk guard 224 relative to the housing 202. Additionally, the first and second receivers 802, 804 may also substantially restrict the disk guard 224 from deflecting towards the cutting disk 214 when an underlying object is contacted. In one example, when an object is contacted by the disk guard 224, the first and second receivers 802, 804 may contact the respective first and second stop surface 404, 406 to substantially inhibit deflection of the disk guard 224 relative to the housing 202.

In the illustrated embodiment of FIG. 8, the disk guard 224 forms a body 800. The body may include a radial front edge or lip 306 as shown. The body 800 includes a front end 810 and a rear end 812. For orientation purposes, the front end 810 of the body is disposed in a direction towards the travel direction 110, whereas the rear end 812 is disposed closest to the housing 202. As previously described, the outer lip or front edge radially terminates and forms the first receiver surface 802 at a first end and the second receiver surface 804 at a second end. The first and second receiver surfaces are oriented towards the rear end 812 of the body and thus face the housing 202 and its stop surfaces.

Rearward of the outer lip 306 is a rear surface 814 of the body 800. The rear surface 814 may be substantially planar and define a radial or U-shaped opening 816 as shown in FIG. 8. The rear surface 814 may be defined along a first plane, although in various embodiments only a portion thereof may be planar. The body 800 may also include a first raised or offset surface 818 and a second raised or offset surface 820. The first offset surface 818 may be partially disposed along a second plane, and the second offset surface 820 may be partially disposed along a third plane. In one example, the first plane is offset and disposed at a location below the second and third planes. In another example, the second plane and third plane may be coplanar. In a further example, the first plane, second plane, and third plane may be parallel to one another. Alternatively, at least one of the first plane, second plane, and third plane may not be parallel to the other two planes.

The first offset surface 818 may be planarly disposed and define a first opening 822. The first opening 822 may be in alignment with either the first or second tab of the housing 202. A fastener (e.g., screw, bolt, etc.) may be disposed through the first opening and a corresponding opening of the respective tab to securely couple the disk guard 224 to the housing 202. Likewise, the second offset surface 820 may be planarly disposed and define a second opening 824. The second opening 824 may be in alignment with the other of the first or second tab of the housing 202. Another fastener may be disposed through the second opening 824 and a corresponding opening in the respective tab for securely coupling the disk guard 224 to the housing 202. The design of the disk guard 224 may vary from that described above. While the front edge or outer lip 306 is described as being radial, it is further possible that the front edge or outer lip 306 is squared off or has any known design.

As also shown in the embodiment of FIG. 8, the first and second rib 308, 310 may also have a third and fourth receiver surface 806, 808 defined at the respective terminus of the rib. The third and fourth receiver surface 806, 808 may function in substantially the same way as the first and second receiver 802, 804 described above. More specifically, the third and fourth receiver surfaces 806, 808 may also correspond with a third and fourth stop surface (not specifically shown) defined in the housing 202. In this embodiment, the third and fourth receiver 806, 808 may contact the third and fourth stop surface to provide supplemental reinforcement to inhibit deflection of the disk guard 224 relative to the housing.

Figure 9:
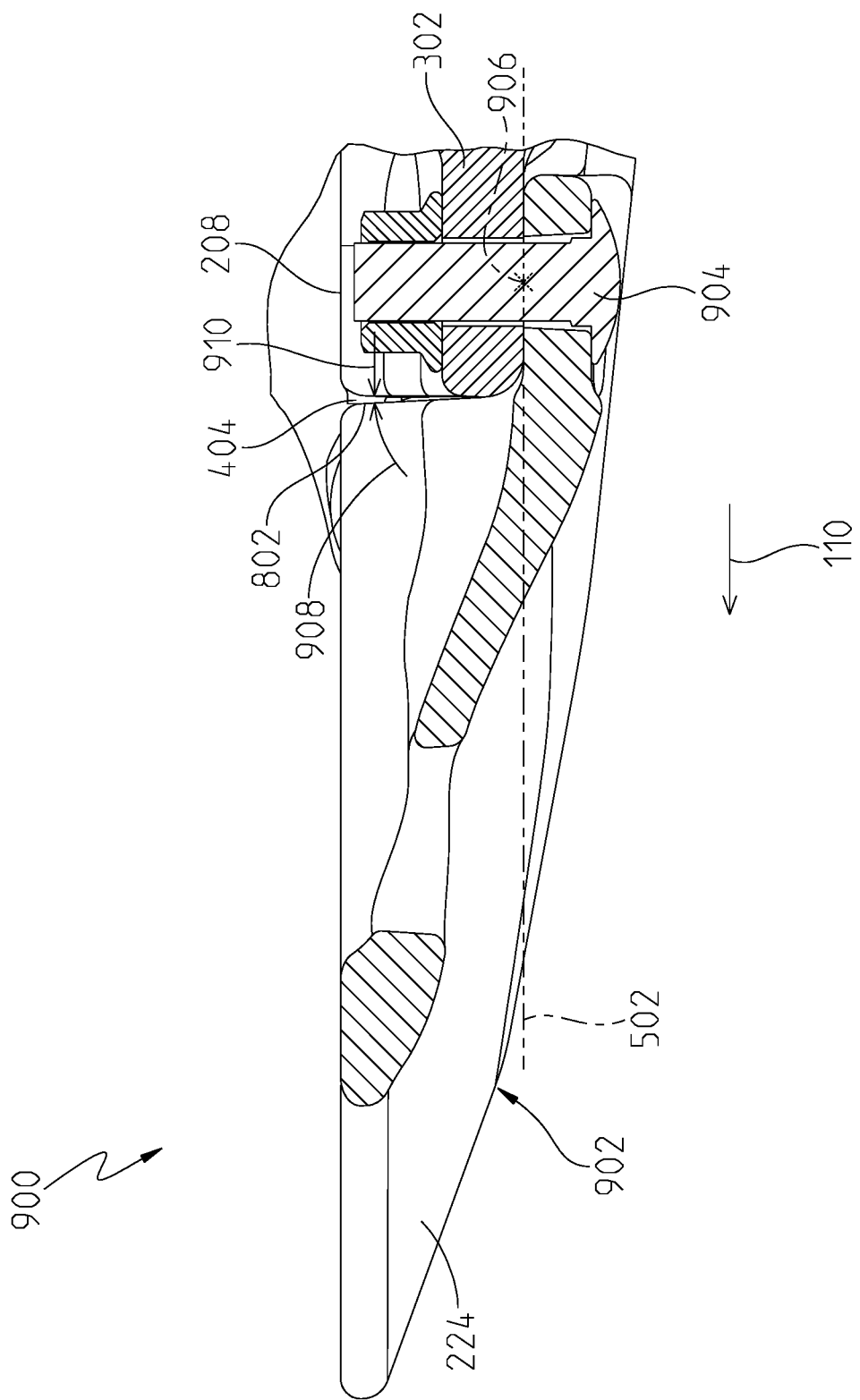
FIG. 9 is a section side-view of the cutterbar assembly with the disk guard coupled thereto.

Referring now to FIG. 9, a section view with a force diagram 900 is shown representing how the disk guard 224 may react to a force input 902 caused by contact with an underlying object or other obstruction encountered when the work machine 100 is moving in the harvest direction 110. As shown in FIG. 9, the force input 902 may act on a leading portion of the disk guard 224 to apply a force to the disk guard 224 away from the underlying surface and toward the first surface 208 of the housing 202.

The disk guard 224 may be coupled to the first tab 302 with a coupler 904 to define a primary pivot axis 906 at the coupling location. The coupler 904 may be a screw, bolt, rivet, or other similar coupling hardware, and this disclosure is not limited to any particular type of coupler 904. The primary pivot axis 906 may be the axis about which the disk guard 224 pivots responsive to the force input 902. An illustrative deflection force 908 or torque is shown as an example of a force that may be experienced by the disk guard 224 during an impact causing the force input 902. The first receiver's 802 alignment and contact with the first stop surface 404 may apply a sufficient resistive force 910 to substantially counter the pivot force 908 and thereby prohibit the disk guard 224 from deflecting about the primary pivot axis 906. Although not specifically shown, the second receiver 802 and stop surface 406 may also react in substantially the same way.

As shown and described above, the spacing of the first stop surface 404 and first receiver 802 offset from the tab plane 502 may allow for a sufficient resistive force 910 to avoid deflection of the disk guard 224 relative to the housing 202. Accordingly, the cutterbar assembly 200 may respond to the force input 902 by lifting off of the underlying surface to pass over the underlying object. However, in another embodiment, only a portion of the cutterbar assembly 200 may lift to overcome the object responsive to the force input 902.

Figure 18:
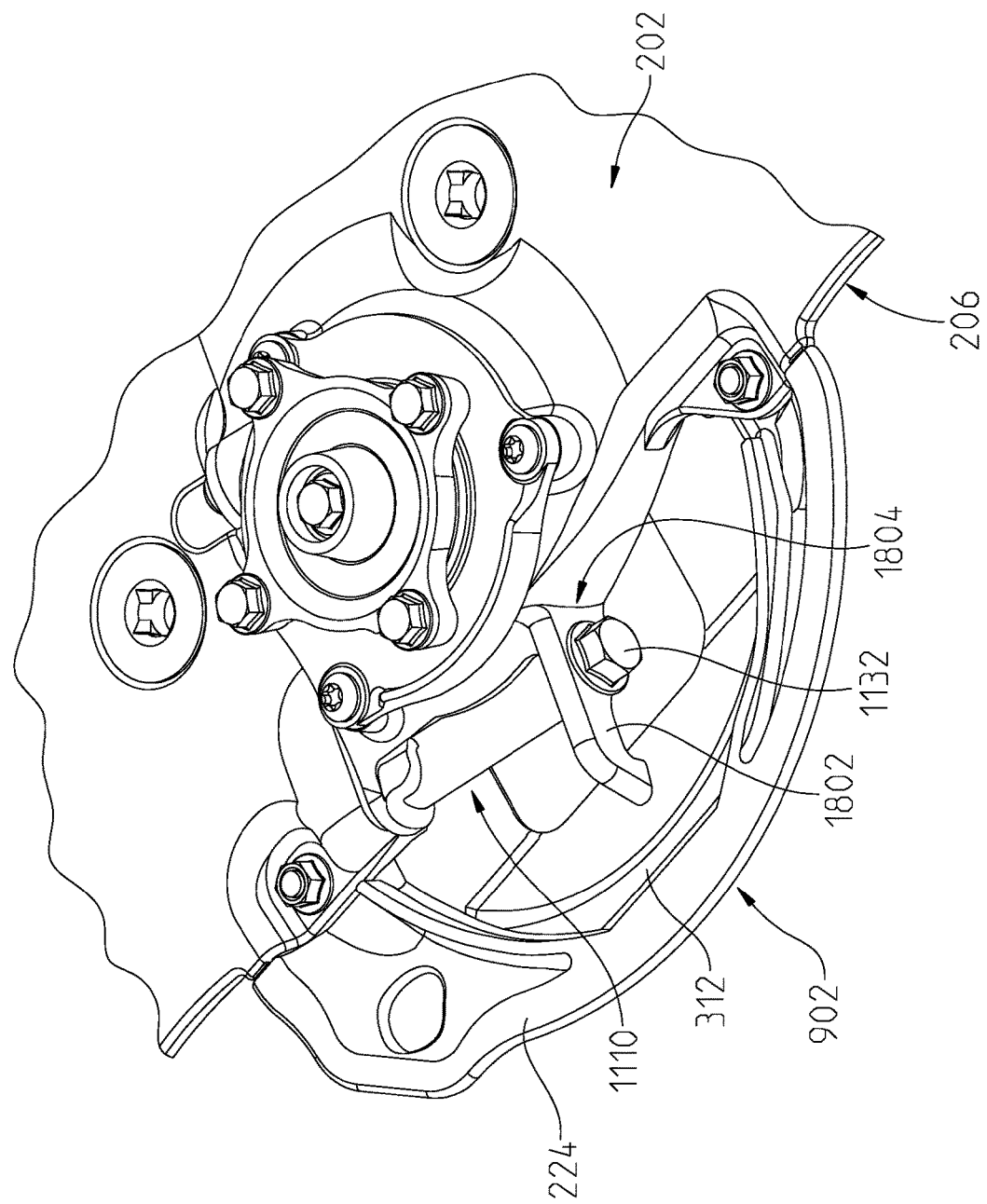
FIG. 18 is a partial top-side perspective view of the disk guard coupled to the cutterbar assembly with an extension arm.

An extension arm 1802 may also provide additional structural support to the disk guard 224 as shown in FIG. 18. The extension arm 1802 may extend from the housing 202 towards the nose section 312 of the disk guard 224 and terminate proximate to the surface of the disk guard 224. Further, the housing 202 may define a receiver or opening for the extension arm 1802 to be coupled to the housing 202. In one embodiment, the extension arm 1802 may be coupled to a first coupler mount 1110 via one or more shoulder bolt 1132 or the like as described in more detail below regarding FIGS. 11a-11c.

The extension 1802 may have a housing contact surface 1804 where the extension arm 1802 may contact the housing 202 to resist deflection caused by the force input 902. More specifically, the contact surface 1804 may restrict the extension arm 1802 from pivoting about the shoulder bolt 1132 by contacting the front edge 206 of the housing 202. If the disk guard 224 experiences the force input 902, the extension arm 1802 may provide additional resistance to the disk guard 224 to reduce deflection.

The extension arm 1802 may also substantially resist pivoting about the shoulder bolt 1132 because of the clamping force of the shoulder bolt 1132 along the first coupler mount 1110. Accordingly, the extension arm 1802 may add rigidity between the disk guard 224 and the housing 202 to aid the first and second receivers 802, 804 in resisting deflection of the disk guard 224 relative to the housing 202.

While the extension arm 1802 has been described above as extending from the first coupler mount 1110, in one embodiment it may extend from the disk guard 224 instead. In this embodiment, the extension arm 1802 may be removably coupled to the disk guard 224 and extend to a receiver defined at the front edge 206 or otherwise in the housing 202. In this embodiment, the extension arm 1802 may function in substantially the same way as described above.

While the extension arm 1802 has been shown and described as being removably coupled between the disk guard 224 and the housing 202, the extension arm 1802 may also be integrally formed with the housing 202. In this embodiment, when the disk guard 224 is coupled to the housing 202 as described above, the extension arm 1802 may become positioned adjacent to a receiver defined in the disk guard 224. Accordingly, no additional couplers are needed to utilize the extension arm 1802. Alternatively, the extension arm 1802 may be integrally formed with the disk guard 224 and extend to a receiver in the housing 202. This disclosure is not limited to any particular coupling method of the extension arm 1802 between the disk guard 224 and the housing 202.

Figure 10A:
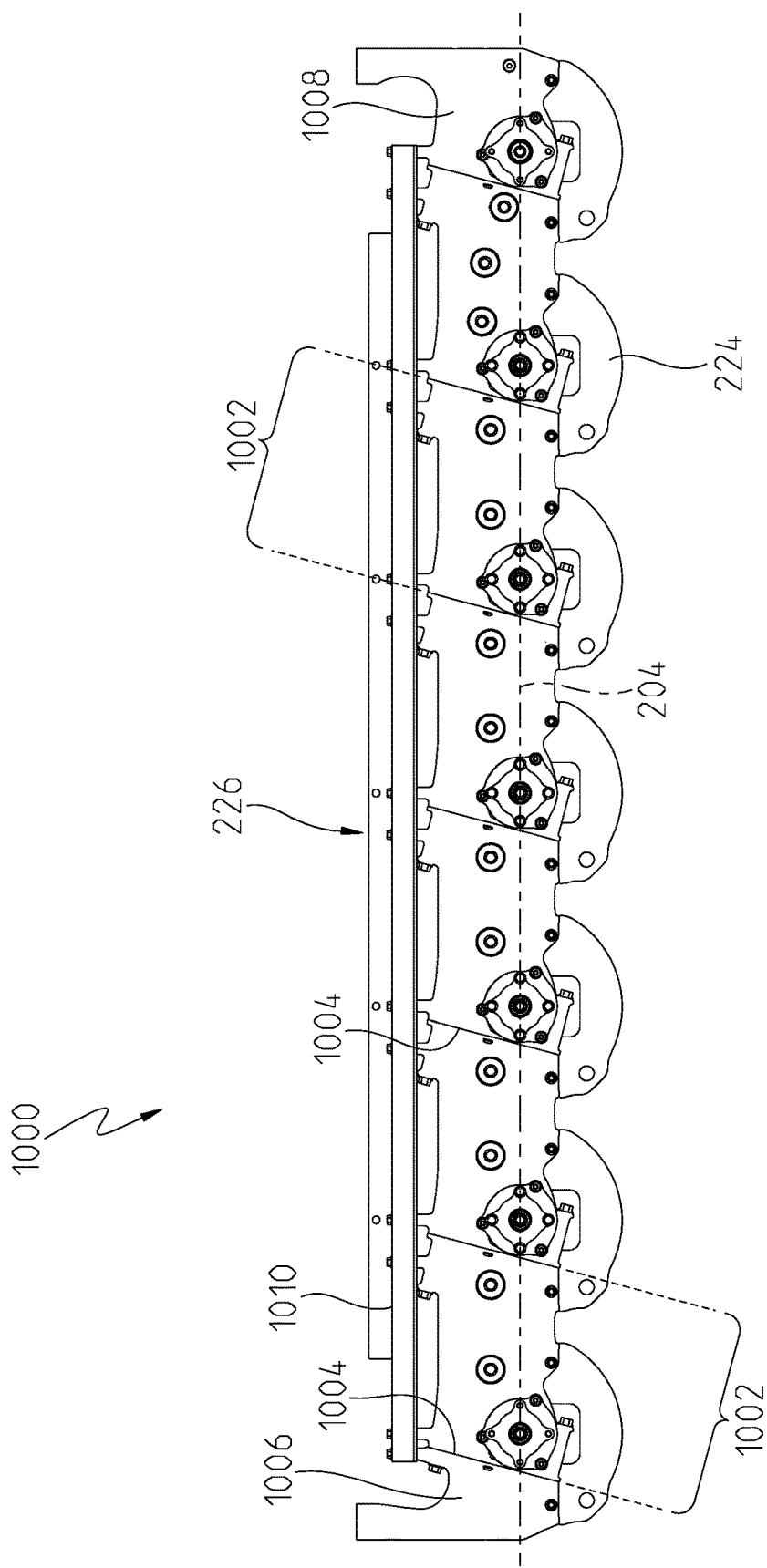
FIG. 10a is a topside view of a modular cutterbar assembly with the cutting disks removed.

In a different embodiment of the cutterbar assembly, a plurality of modules 1002 may be coupled to one another to form a modular cutterbar 1000 as shown in FIG. 10a. In FIG. 10a the plurality of modules 1002 are shown coupled to one another with the cutting disks 214 removed. With the cutting disks 214 removed, one or more joints 1004 may be seen between adjacent modules 1002. The joints 1004 may be corresponding adjacent surfaces of each module 1002. The joints 1004 are sized to allow one module 1002 to be coupled to an adjacent module 1002 along the joint 1004 to form a substantially fluidly sealed connection at the joint 1004. The joints 1004 may be defined along a surface plane (not particularly shown) that is not perpendicular to the cutterbar axis 204. For example, in the embodiment of FIG. 10A, the one or more joints 1004 may be angularly disposed relative to the cutterbar axis 204. However, this disclosure is not limited to such a spatial configuration of the joints 1004 and in a different embodiment the joint plane may be at least partially perpendicular to the cutterbar axis 204.

In the configuration shown in FIG. 10a, the modular cutterbar assembly 1000 may function in substantially the same way as the cutterbar assembly 200 described above. However, the housing 202 may include a plurality of modules 1002 coupled to one another along adjoining adjacent ends at each respective joint 1004.

Each module 1002 may be substantially identical to the adjacent module 1002. Further, each module 1002 may define a portion of the inner cavity 1144 and house a portion of the drive transfer mechanism discussed above. When two or more modules 1002 are coupled to one another, the respective drive transfer mechanisms housed within each module may also be coupled to one another to transfer the driving torque to the respective disk hub assemblies 212. The plurality of modules 1002 may be positioned between a first end cap 1006 and a second end cap 1008. The first and second end cap 1006, 1008 may be able to correspond with any number of modules 1002 positioned therebetween. Accordingly, any number of modules 1002 can be coupled to one another along the cutterbar axis 204, and this disclosure is not limited to any particular number of modules 1002.

In one embodiment of the present disclosure, a supplemental support beam 1010 may span a substantial portion of the modular cutterbar 1000. The beam 1010 may be one integral component that spans the rear edge 226 of the modular cutterbar 1000 and is coupled to each module 1002. More specifically, the modular cutterbar 1000 may impact underlying objects along the underlying surface as described above. As the disk guard 224 contacts the object, the modular cutterbar 1000 may deflect away from the underlying portion at the location of the object. The deflection of a portion of the modular cutterbar 1000 may cause strain at one or more of the joints 1004. The beam 1010 may provide additional structural support to the modular cutterbar 1000 to strengthen the joints 1004 as the modular cutterbar 1000 contacts the underlying object.

The modular cutterbar 1000 may be coupled to the work machine 100 in a plurality of different ways, and this disclosure is not limited to any particular coupling location or method. In one embodiment, the cutterbar assembly 1000 may be coupled to the work machine at each end through the respective first and second end cap 1006, 1008. In this embodiment, the cutterbar 1000 may sag along a middle section when the cutterbar assembly 1000 is raised by the first and second end cap 1006, 1008. Alternatively, when the cutterbar assembly 1000 contacts an underlying object a portion of the cutterbar assembly 1000 may arc or move vertically between the first and second end cap 1006, 1008. In another embodiment, the cutterbar assembly 1000 may be cantilevered to the work machine 100 from only one of the end caps 1006, 1008 or at any one of the modules 1002 therebetween. In either embodiment, a vertical bending moment may be experienced by the cutterbar module proximate to the coupling location(s).

Figure 10B:
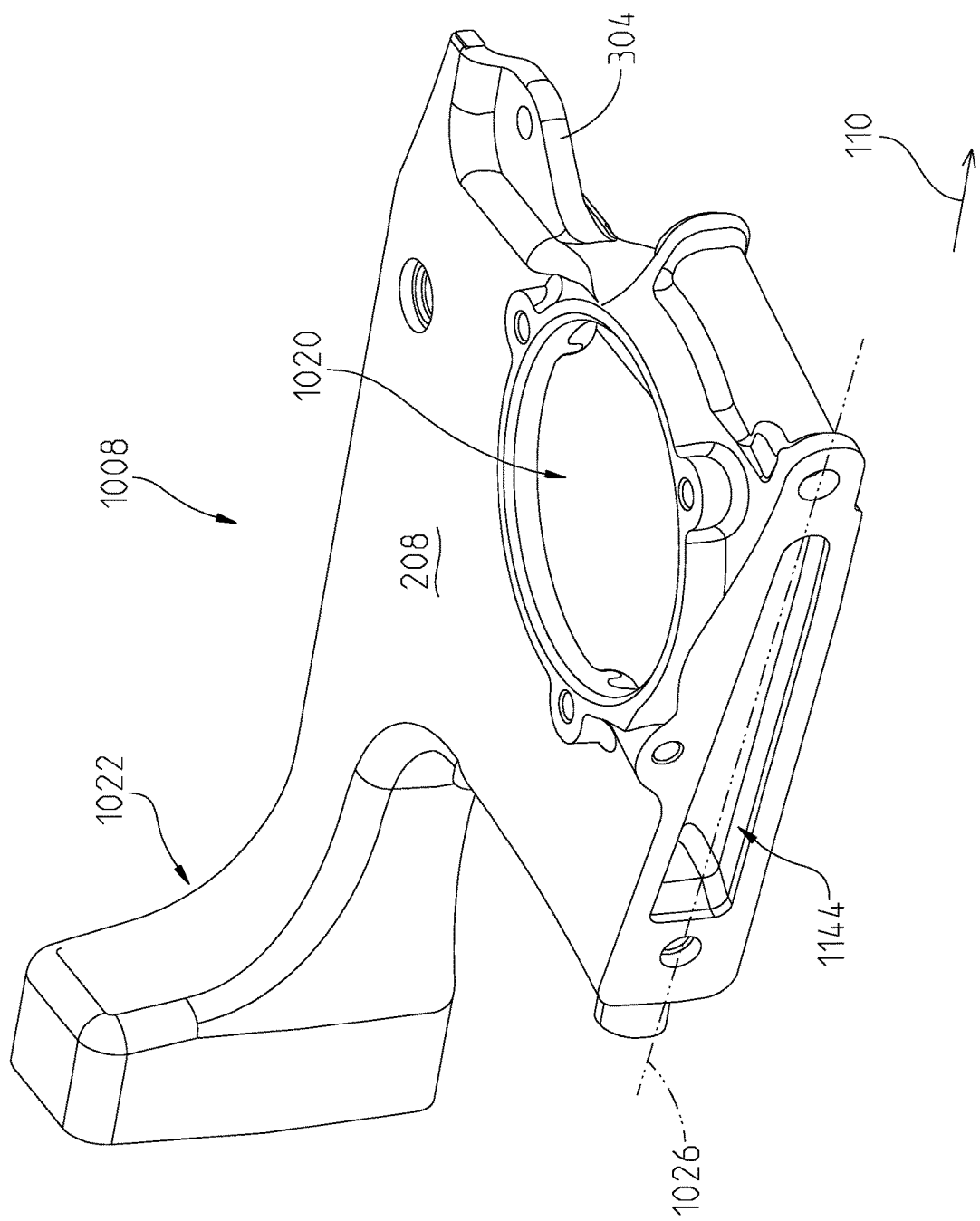

In one non-exclusive aspect of the present disclosure, the second end cap 1008 may have an aperture 1020 integrally formed through the first surface 208 as shown in FIG. 10b. The aperture 1020 may be sized to receive a disk hub assembly 212 in a similar way as described for each module 1002 of the modular cutterbar 1000. The second end cap 1008 may also define a portion of the inner cavity 1144. In one embodiment, the second end cap 1008 may have a disk hub assembly 212 positioned therein. The second end cap 1008 may be coupled to any number of adjacent modules 1002 and house a portion of the drive transfer mechanism within the inner cavity 1144. Further, the second end cap 1008 may also enclose the inner cavity to allow fluid to be contained therein along the modular cutterbar assembly 1000.

Figure 10C:
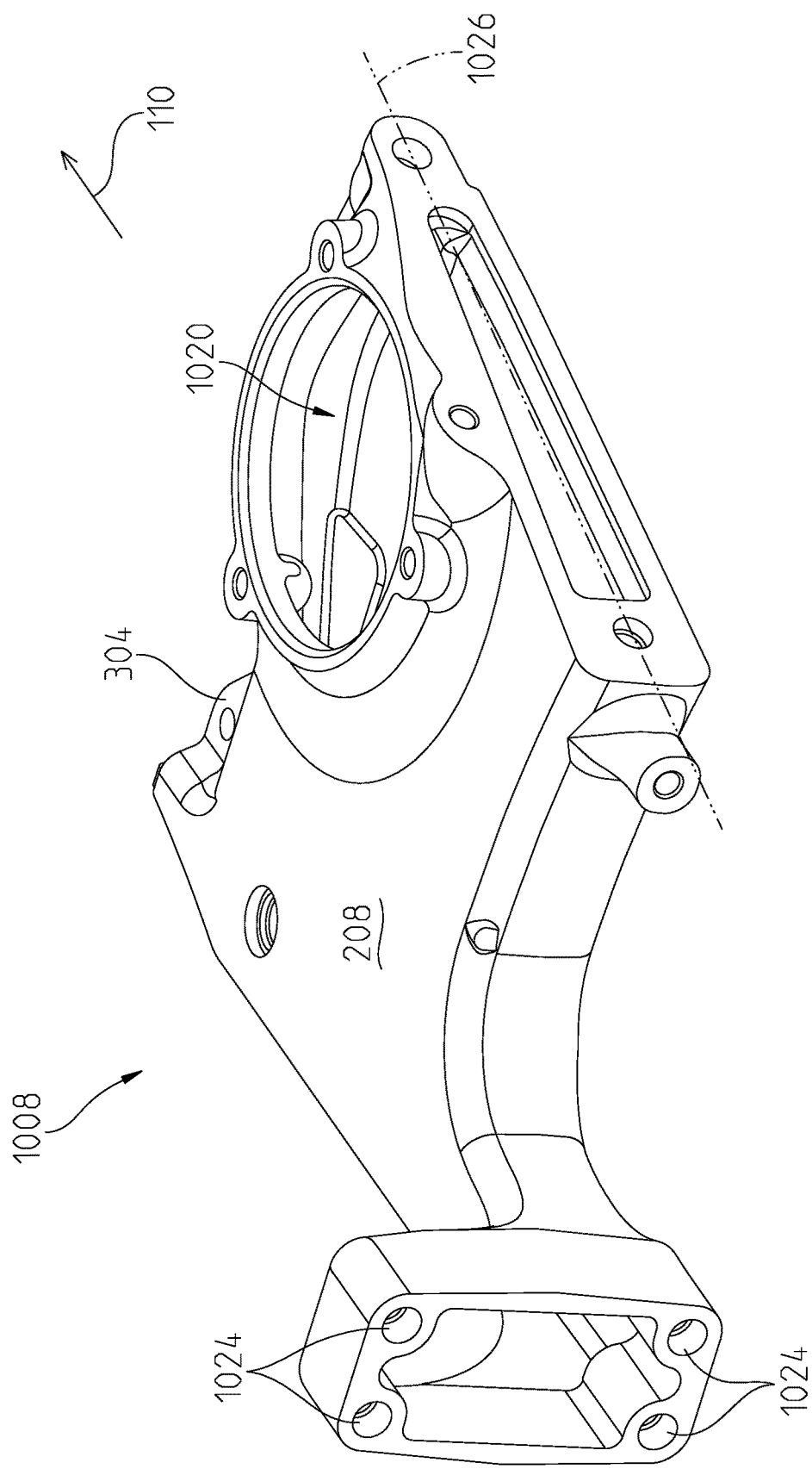

In one aspect of the second end cap 1008, a coupler arm 1022 may also be integrally formed therewith. The coupler arm 1022 may provide a structural location to mount the modular cutterbar 1000 to the work machine 100. In the non-exclusive example shown in FIG. 10b, the coupler arm 1022 may extend opposite the harvest direction 110 away from the second end cap 1008. The coupler arm 1022 may define one or more arm couplers 1024 (FIG. 10c) that provide a mounting location for the modular cutterbar 1000 to be removably coupled to the work machine 100 with one or more fastener.

While a particular coupler arm 1022 is shown and described above, the coupler arm 1022 is not limited to being shaped or positioned in this particular way. In one embodiment, the coupler arm 1022 is positioned along the first surface 208. In another embodiment, the coupler arm is positioned along an outer side of the second end cap 1008. The coupler arm 1022 can be positioned along any portion of the second end cap 1008 without straying from the teachings of this disclosure.

A first joint 1026 may be positioned outside of the aperture 1020 relative to the coupler arm 1022 by integrally forming the second end cap 1008 with the aperture 1020. More specifically, the aperture 1020 may be positioned so a portion of the second end cap 1008 completely surrounds, and provides a mounting location for, a corresponding disk hub assembly 212. This configuration allows the first joint 1026 to experience a vertical bending moment to be positioned towards an inner portion of the modular cutterbar 1000 relative to the first aperture 1020. A person having skill in the relevant art will understand that the modular cutterbar 1000 may experience the greatest vertical bending moment proximate to the coupler arm 1022 or other mounting location. Accordingly, by positioning the first joint 1026 towards the center of the modular cutterbar 1022 relative to the aperture 1020, the vertical bending moment experienced by the first joint 1026 is reduced.

While integrally forming an aperture 1020 into the second end cap 1008 has been shown and described in detail herein, the same principles and teachings are equally applicable for the first end cap 1006. More specifically, the first end cap 1006 may also have an aperture for a disk hub assembly 212 integrally formed therein. In this embodiment, instead of having a joint 1004 between the first end cap 1006 and the adjacent module 1002 (as shown in FIG. 10a), the adjacent module 1002 may be integrally formed with the first end cap 1006 as described above for the second end cap 1008.

In addition to having an aperture 1020 integrally formed into the first and second end caps 1006, 1008, the first and second end caps 1006, 1008 may also have integrally formed therein at least one of, or both of, the first and second tabs 302, 304 for the disk guard 224. More specifically, regarding the second end cap 1008, the second tab 304 may be integrally formed as part of the second end cap 1008. The second tab 304 may allow the disk guard 224 to be coupled to the second tab 304 on one end, and to the first tab 302 of the adjacent module 1002 at the other end. The disk guard 224 may provide additional reinforcement to the first joint 1026 when it is exposed to a vertical bending moment because the disk guard 224 is coupled between the second end cap 1008 and the adjacent module 1002. The first end cap 1006 may similarly utilize the disk guard 224 to provide supplemental reinforcement along a first joint.

Now referring to FIG. 11a, a partial half-section view of several modules 1002 is shown. More specifically, the cross-section of the first coupler mount 1110 and a second coupler mount 1112 is shown. The first coupler mount 1110 may be along the front edge 206 and the second coupler mount 1112 may be along the rear edge 226 of the modular cutterbar 1000. Further, the first and second coupler mounts 1110, 1112 may be at the respective joint 1004 of adjoining modules 1002.

The first and second coupler mounts 1110, 1112 may define respective coupler axes 1130 therein. The coupler axes 1130 may be substantially perpendicular to the surface plane of the joint 1004 to allow proper alignment and a coupler clamping force between the adjacent modules 1002. More specifically, in one non-exclusive embodiment, the shoulder bolt 1132 may be positioned at each of the first and second coupler mounts 1110, 1112 along the coupler axis 1130. Each respective shoulder bolt 1132 may have a head portion 1134, a shoulder portion 1136, and a threaded portion 1138 as is known in the art.

Now referring to FIG. 11b, a partial section view of the first and second coupler mounts 1110, 1112 is shown. While only particular details for the first coupler mount 1110 are described herein, the same teachings and principles are equally appropriate for the second coupler mount 1112.

The first and second coupler mounts 1110, 1112 may correspond with the size and shape of the shoulder bolt 1132. More specifically, the first coupler mount 1110 may have a through-hole defined in a first boss 1116 that corresponds with the diameter of the shoulder portion of the shoulder bolt 1132. Further, the first coupler mount 1110 may have a first partial through-hole 1118 that contain threads along the threaded portion 1138 and that corresponds with the threads on the shoulder bolt 1132. In one aspect of the present disclosure the shoulder portion 1136 may extend at least partially through the joint 1004. In this configuration, the shoulder portion 1136 of the shoulder bolt 1132 may align the adjacent modules 1002 with one another as they are coupled together.

While a shoulder bolt 1132 has been specifically described herein, this disclosure is not limited to utilizing a shoulder bolt 1132 as a coupling mechanism. More specifically, an entirely threaded bolt may be used instead of a shoulder bolt. In this embodiment, one or more dowels or other similar locator may be positioned between the adjacent modules 1002 to ensure proper alignment while a fastener couples adjacent modules to one another. In another embodiment, the threaded bolt may not require a dowel or locator. Further, any other similar coupling mechanism is also considered herein and this disclosure is not limited to any particular type of coupling mechanism at the first and second coupler mount 1110, 1112.

Another non-limiting aspect of the present disclosure is the position of the coupler axis 1130 relative to the joint 1004. As briefly described above, the coupler axis 1130 may be substantially perpendicular to the surface plane at the joint 1004. In this configuration, the shoulder bolt 1132 may apply a compressive force on adjacent modules 1002 at the joint 1004 as the proper torque is applied to the shoulder bolt 1132. More specifically, by positioning the coupler axis 1130 perpendicular to the surface plane of the joint 1004, the compressive force applied by a properly coupled shoulder bolt 1132 directly pulls and couples the adjacent modules 1002 together along the joint 1004.

A shoulder portion length 1140 may also allow the first coupler mount 1110 to be positioned close to a pinion gear 1508 (or other drive mechanism for the second coupler mount 1112) while allowing sufficient access to the bolt head 1134. In one embodiment, the coupler axis 1130 is spaced from the outer radius of the pinion gear 1508 by a defined clearance 1142. The clearance 1142 may be as small as possible while allowing sufficient strength in the housing 202 and avoiding interference with the pinion gear 1508. In one non-exclusive example, the clearance 1142 may be between fifteen and thirty-five millimeters (15-35 mm).

Further, the shoulder portion length 1140 may be long enough to position the head portion 1134 of the shoulder bolt 1132 sufficiently away from the pinion gear 1508 to avoid contact therewith. The shoulder portion length 1140 may also position the head portion 1134 along the front edge 206 to allow access thereto (or rear edge for the second coupler mount 1112).

In one aspect of the above embodiment, the joints 1004 may be angularly offset from the harvest direction 110 at a joint angle 1128. As shown in FIG. 11b, the joint angle 1128 may be any angle, but in one nonexclusive example the joint angle 1128 is between five and twenty-five degrees (5-25°) relative to the harvest direction 110. Further, as described above, the first and second coupler mounts 1110, 1112 define respective coupler axes 1130 that are perpendicular to the surface plane of the joint 1004. Accordingly, the coupler axes 1130 are also angularly offset from and not perpendicular to, the harvest direction 110. The offset and non-perpendicular disposition of the joint 1004 and the coupler axis 1130 relative to the harvest direction 110 may provide for both minimizing the clearance 1142 and allowing access to the head portion 1134 as described above.

The first and second coupler mounts 1110, 1112 may also be disposed along the respective front and rear edge 206, 226 at a location between planes defined by the top surface 208 and the bottom surface 210 as is more clearly shown in FIG. 5. In this position, the first and second coupler mounts 1110, 1112 may not substantially increase the thickness of the cutterbar assembly, thereby allowing the knives 316 to become closely positioned to the underlying surface.

The first and second coupler mounts 1110, 1112 may also be disposed in substantially opposite directions relative to one another. A first module 1104 and a second module 1108 may be shown coupled to one another in FIG. 11b. In this embodiment, the first partial through-hole 1118 of the first coupler mount 1110 may be defined in the first module 1104 while a second partial through-hole 1122 of the second coupler mount 1112 may be defined in the second module 1108. By positioning the first and second coupler mounts 1110, 1112 in substantially opposite orientations along the joint 104, the head portion 1134 of the respective shoulder bolts 1132 may be angularly positioned away from the cutterbar axis 204 and allow easy access while maintaining the spatial advantages described above. Similarly, the respective partial through-hole 1118, 1122 may be angularly positioned towards the cutterbar axis 204, reducing the amount of added material required on the respective front and rear edge 206, 226.

While a particular angle and orientation of the joint 1004 and coupler axis 1130 has been described above, this disclosure is not limited to such a configuration. Rather, any angular orientation of the joint and the coupler axis 1130 is considered herein. More specifically, the joint 1004 may be positioned at different angles relative to the harvest direction 110 to maximize access to the couplers or shoulder bolts 1132. Further, any joint angle 1128 that produces a minimal clearance 1142 is also considered herein. Further still, while the coupler axis 1130 has been shown and described as being perpendicular to the surface plane of the joint 1004, it can also be angularly offset at any angle therefrom. Accordingly, this disclosure is not limited to the particular configurations and angles described above or shown in the accompanying figures.

In another embodiment, the joint 1004 may be a compound miter-type joint. More specifically, in addition to being angled greater than zero relative to the direction of travel 110, the surface plane of the joint 1004 may not be perpendicular relative to the first surface 208. In other words, the surface plane of the joint 1004 may be angled greater than zero relative to the direction of travel 110 and not perpendicular to the first surface 208.

Now referring to FIG. 11c, an expanded joint 1004 is shown. More specifically, a first coupling end 1102 of the first module 1104 is shown spaced from a second coupling end 1106 of the second module 1108. In addition to the first coupler mount 1110 and the second coupler mount 1112, the first and second module 1104, 1108 may be coupled to one another through a third coupler mount 1114.

The first coupler mount 1110 may be positioned substantially along the front edge 206 of the modular cutterbar 1000 as described in more detail above. Further, in one non-exclusive embodiment, the first coupler mount 1110 may be a through-hole defined in the first boss 1116 of the second module 1108 that aligns with the first partial through-hole 1118 defined in the first module 1104 when the first and second module 1104, 1108 are coupled to one another. Further, the first boss 1116 and through-hole of the second module 1108 may correspond with the shaft and head size of the shoulder bolt 1132. Similarly, the shaft of the shoulder bolt 1132 may have a threaded portion that corresponds with the first partial through-hole 1118 defined in the first module 1104 at the first coupler 1110.

The second coupler mount 1112 may be substantially similar to the first coupler mount 1110 albeit positioned along the rear edge 226 of the modular cutterbar 1000 as described above. In one non-exclusive embodiment, the second coupler mount 1112 may be a through-hole defined in a second boss 1120 of the first module 1104 that aligns with the second partial through-hole 1122 defined in the second module 1108 when the first and second module 1104, 1108 are coupled to one another. Further, the second boss 1120 and the through-hole of the first module 1104 may also correspond with the shaft and head size of the shoulder bolt 1132. Similarly, the shaft of the shoulder bolt 1132 may have a threaded portion that corresponds to the second partial through-hole 1122 defined in the second module 1108 at the second coupler 1112.

The third coupler mount 1114 may protrude at least partially from the first surface 208. Further, the third coupler mount 1114 may be positioned near the front edge 206 or the rear edge 226 or at any point therebetween on module 1104 with corresponding attachment points in adjacent module 1108. The third coupler mount 1114 may have a third boss 1124 that defines a through-hole positioned in the first module 1104 and a third partial through-hole 1126 defined in the second module 1108. The third boss 1124 and third threaded partial through-hole 1126 may be sized to receive a bolt.

While each coupler mount 1110, 1112, and 1114 has been described to utilize a bolt as a coupling mechanism, this disclosure is not limited to such a configuration. Rather, any known coupling method for coupling two components to one another is considered herein. More specifically, a clamping mechanism may utilize the coupler mounts 1110, 1112, 1114 to couple the first module 1104 to the second module 1108. Further still, welds, adhesives, soldering, or the like may also be used to couple the respective coupling mounts 1110, 1112, 1114 to one another. Accordingly, this disclosure is not limited by any particular method for coupling the coupling mounts 1110, 1112, 1114 to one another.

Figure 12:
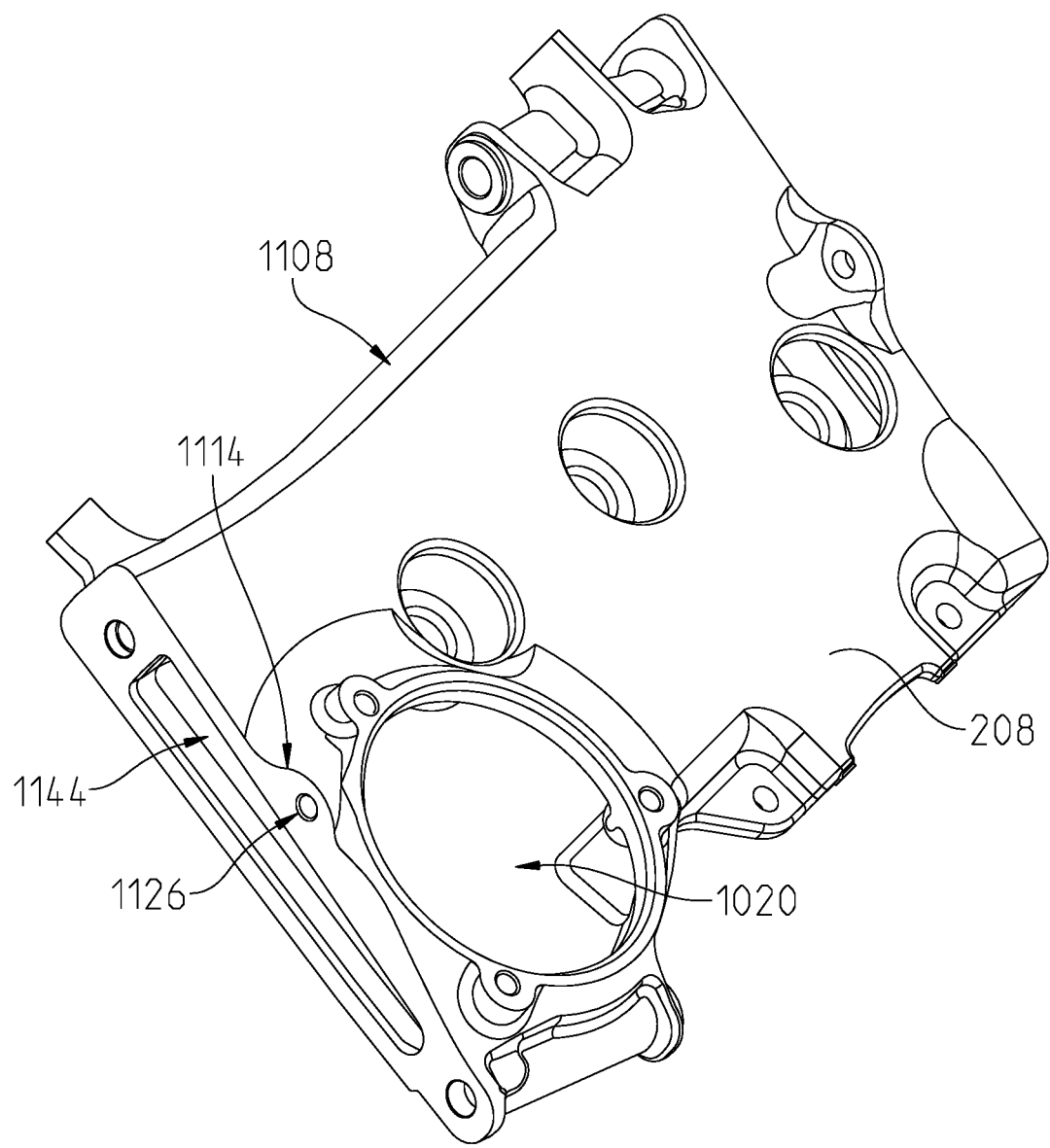

Referring now to FIG. 12, the third coupler mount 1114 is more clearly shown. Also shown in FIG. 12 is the aperture 1020 sized to accommodate the disk hub assembly 212. The aperture 1020 may allow the disk hub assembly 212 to be coupled to the drive transfer mechanism in the inner cavity 1144. In one embodiment, positioning the third coupler mount 1114 close to the aperture 1020 allows the third coupler mount 1114 to protrude away from the first surface 208 and into a toroidal cavity 1302 (FIG. 13) created between the top surface 208 and the cutting disk 214.

Figure 13:
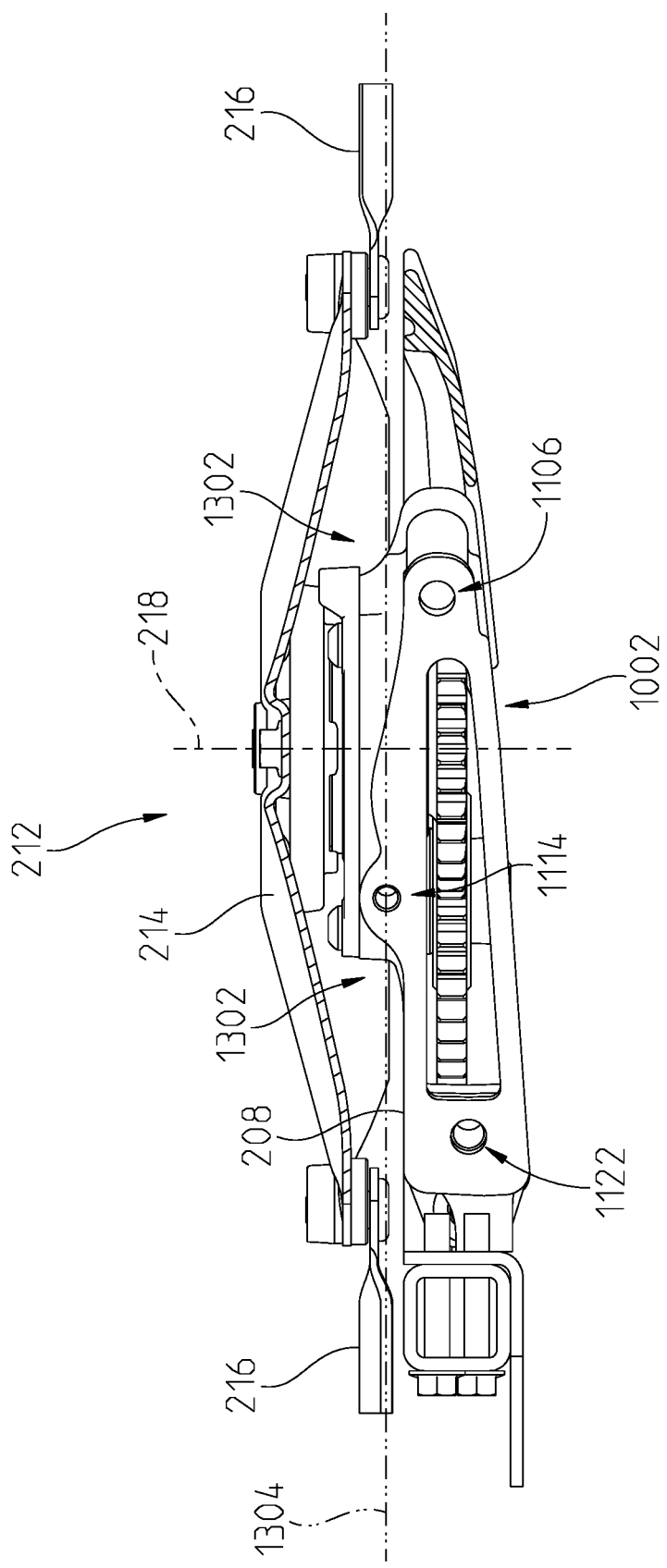

In FIG. 13, a cross-sectional view of one module 1002 at the second coupling end 1106 with the disk hub assembly 212 coupled thereto is shown. The toroidal cavity 1302 may be defined circumferentially about the disk axis 218. Further, the boundaries of the toroidal cavity 1302 may be defined by the first surface 208, the cutting disk 214, and components of the disk hub assembly 212. More specifically, the cutting disk 214 may have a bowl-shaped form and in one non-exclusive embodiment the cutting disk 214 may have an elongated bowl-shaped form. The cutting disk 214 may be coupled to the disk hub assembly 212 at a location offset and away from the first surface 208. Further, the bowl-shaped form of the cutting disk 214 may allow the cutting disk 214 to becoming axially closer to the first surface 208 as it extends radially away from the disk axis 218. Accordingly, as the cutting disk 214 rotates, it does not interfere with the toroidal cavity 1302.

In this embodiment, the third coupler mount 1114 may be offset away from the first surface 208 and partially positioned within the toroidal cavity 1302. In another aspect of this embodiment, the knives 216 may be coupled to the cutting disk 214 and able to rotate about the disk axis 218 to define a knife plane 1304. The knife plane 1304 may be parallel to, but offset from, the first surface 208. Further still, in one non-limiting aspect of the present disclosure, the mounting location for the third coupler mount 1114 may extend away from the first surface 208 and at least partially into the knife plane 1304 as shown in FIG. 13.

Figure 20:
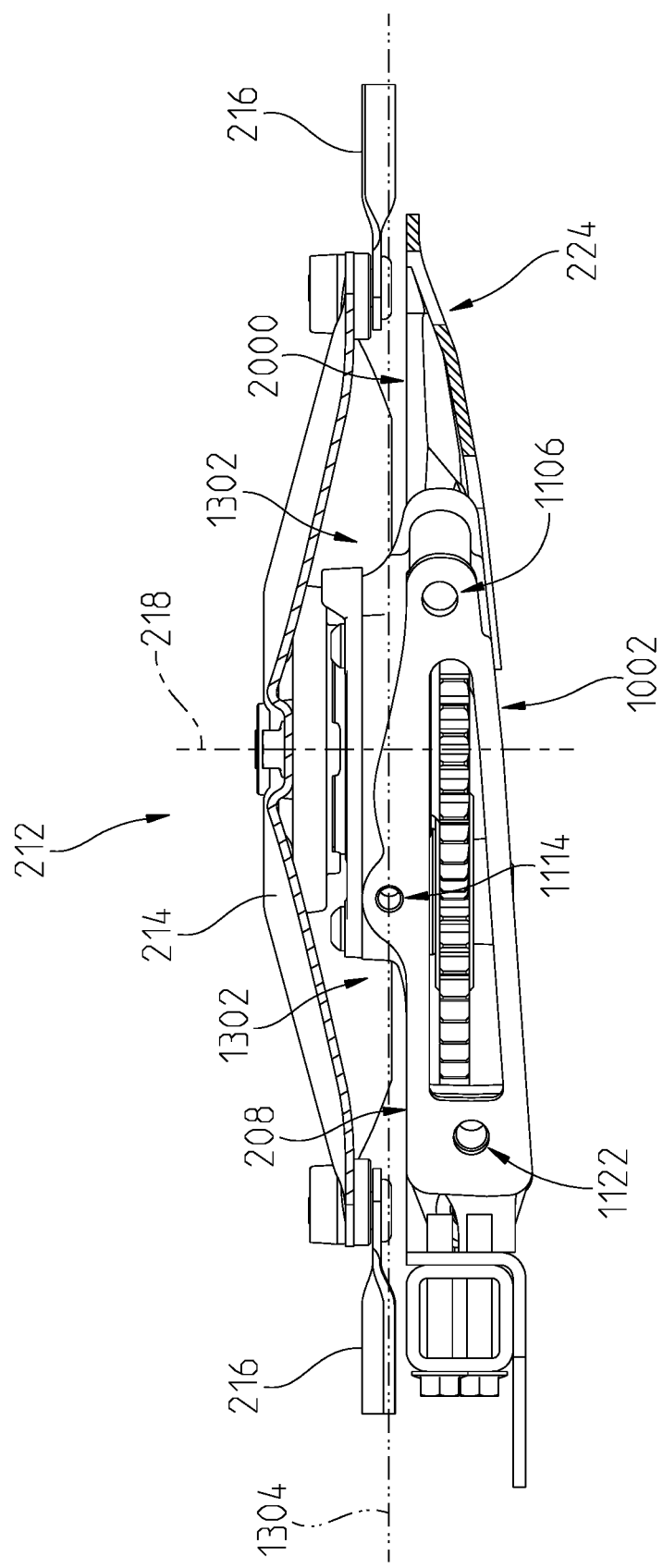

Another embodiment of one module 1002 at the second coupling end 1106 with the disk hub assembly 212 coupled thereto is shown is shown in FIG. 20. In FIG. 13, the disk guard outer surface is defined in a manner that is substantially coplanar with the housing outer surface. In FIG. 20, however, a top surface 2000 of the disk guard 224 may be angled downwardly relative to the knife plane 1304, and in particular, to the housing outer surface. The downward angle of the top surface 2000 may be less than 30°, but it is angled in such a way that allows for more disk guard deflection without contacting the disk.

Figure 14:
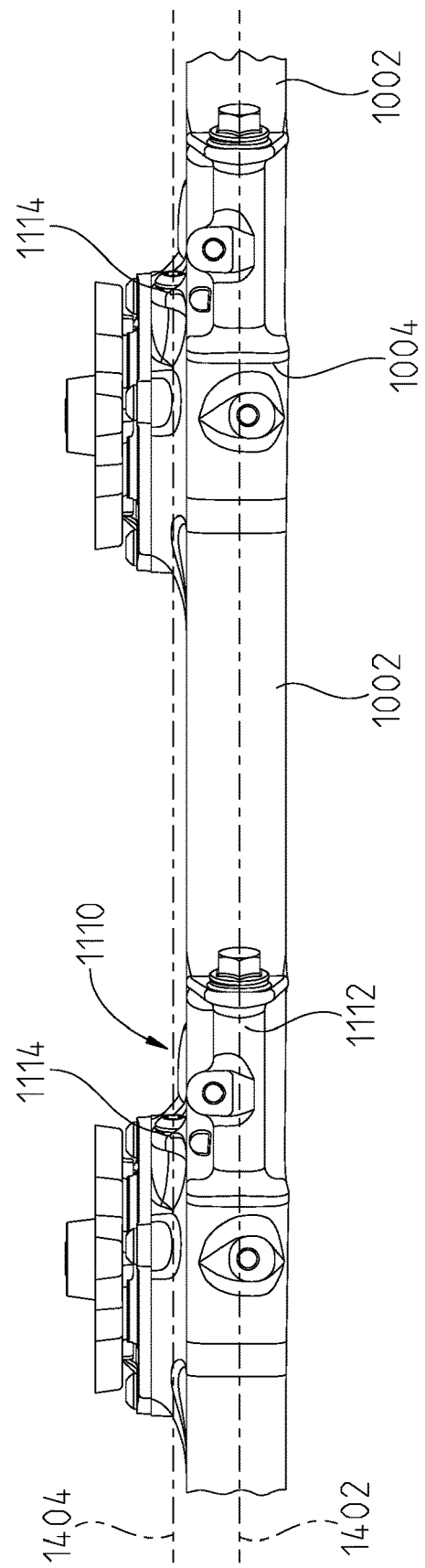

Now referring to FIG. 14, a partial view of the cutterbar assembly 1000 is shown. In this view, a side view of a coupler plane 1402 that passes through the first and second coupler axes 1130 is shown. Also shown in FIG. 14 may be a third coupler axis 1404 that is defined through the third coupler mount 1114 along the length of the modular cutterbar assembly 1000.

In the embodiment shown in FIG. 14, the rigidity of the modular cutterbar assembly 1000 may be increased across the respective modules 1002 by offsetting the third coupler axis 1404 from the coupler plane 1402. More specifically, with the third coupler mount 1114 being offset from the coupler plane 1402, bending moments applied to the modular cutterbar assembly 1000 may be substantially resisted without allowing adjacent modules 1002 to separate at their corresponding joints 1004.

In addition to utilizing the offset third coupler mount 1114 to increase rigidity, the position or location of the disk guard 224 may also increase rigidity of the modular cutterbar assembly 1000. Referring to the disk guards 224 shown in FIG. 3, the disk guard 224 may be coupled to the first module 1104 at the first tab 302 and to the second module 1108 at the second tab 304. In this embodiment, the disk guard 224 may span the joint 1004 to provide additional rigidity to the modular cutterbar assembly 1000 at each joint 1004.

The one or more extensions 602 of the disk guard 224 shown in FIG. 6 may provide additional rigidity to the modular cutterbar assembly 1000. The extensions 602 can extend along a portion of the first and second module 1104, 1108 to ensure the joint 1004 remains properly aligned. Further still, in one embodiment the extension 602 may extend from a portion of the first module 1104, across the joint 1004, and to a portion of the second module 1108. In this embodiment, the extension 602 may provide additional structural support to ensure that the joint 1004 may not substantially separate when the modular cutterbar assembly 1000 experiences a force input.

Figure 15:
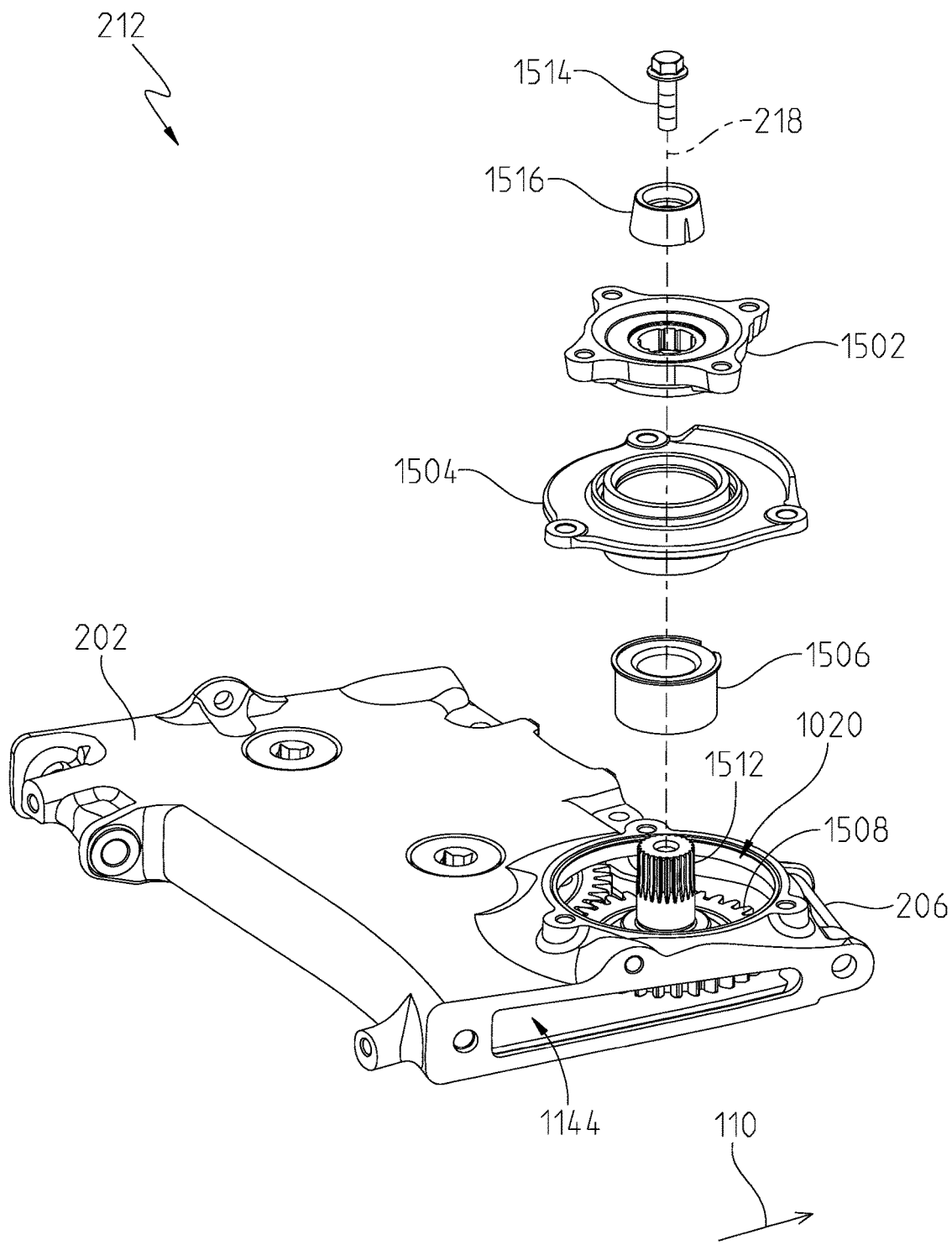
FIG. 15 is an exploded perspective view of the components of a disk hub assembly.

In one embodiment of the modular cutterbar assembly 200, 1000, the disk hub assembly 212 may reduce the amount of debris that can become tangled therearound during operation. To more clearly show this non-exclusive feature of the present disclosure, FIG. 15 illustrates an exploded view of the disk hub assembly 212 along the disk axis 218. More specifically, the disk hub assembly 212 may have a shear or disk hub 1502, a quill or bearing housing 1504, a bearing 1506, and a shaft 1512 coupled to the pinion gear 1508. More specifically, the aperture 1020 may provide a location for the drive transfer mechanism to transfer torque from the inner cavity 1144 to the cutting disk 214 (cutting disk not shown in FIG. 15).

In one aspect of this embodiment, the bearing housing 1504 may be removably coupled to the housing 202 about the aperture 1020. In this embodiment, the bearing housing 1504 may have a through-hole defined therein that corresponds in diameter with the bearing 1506. Accordingly, when the bearing housing 1504 is coupled to the housing 202, the bearing 1506 may be mounted to the bearing housing 1504 and aligned along the disk axis 218.

The bearing 1508 may also have an inner diameter that corresponds with the shaft 1512 that extends from the pinion gear 1508 away from the inner cavity 1144. The bearing 1508 may allow the shaft 1512, and in turn the pinion gear 1508, to rotate about the disk axis 218. In one embodiment, the drive transfer mechanism may provide a torque to the pinion gear 1508 causing the shaft 1512 to rotate within the bearing 1506.

The shaft 1512 may extend sufficiently away from the pinion gear 1508 to allow the disk hub 1502 to be coupled thereto. The disk hub 1502 may have a splined through-hole that corresponds with a splined outer surface of the shaft 1512. In this embodiment, the splined engagement of the shaft 1512 to the disk hub 1502 may allow the shaft 1512 to transfer torque from the drive transfer mechanism to the disk hub 1502. In one non-exclusive example of the splined coupling of the disk hub 1502 to the shaft 1512, the splines may be sized to shear when the disk hub 1502 substantially resists rotation. In this embodiment, the drive transfer mechanism may be substantially protected from damage when the disk hub 1502 is restricted from rotating. More specifically, if the disk hub 1502 cannot rotate when sufficient torque is being distributed through the shaft 1512, the splines coupling the disk hub 1502 to the shaft 1512 may shear, allowing the shaft 1512 to rotate within the disk hub 1502 and thereby substantially protecting the components of the drive transfer mechanism.

The disk hub 1502 may be held in proper axial positioning relative to the shaft 1512 with a shaft spacer 1516 and coupler 1514 that removably couple to a distal end of the shaft 1512. The shaft spacer 1516 may ensure the disk hub 1502 remains axially positioned correctly along the shaft 1512, and the shaft coupler 1514 may restrict the shaft spacer 1516 from moving axially away from the disk hub 1502. The cutting disk 214 may then be coupled to the disk hub 1502 and rotate about the disk axis 218.

While one method of coupling the bearing housing 1504, the disk hub 1502, and the shaft/pinion gear 1512, 1508 has been shown and described above, this disclosure is not limited to any particular coupling method. A person with skill in the relevant art understands the many ways to rotatably couple components to one another and this disclosure considers any known method.

Figure 16A:
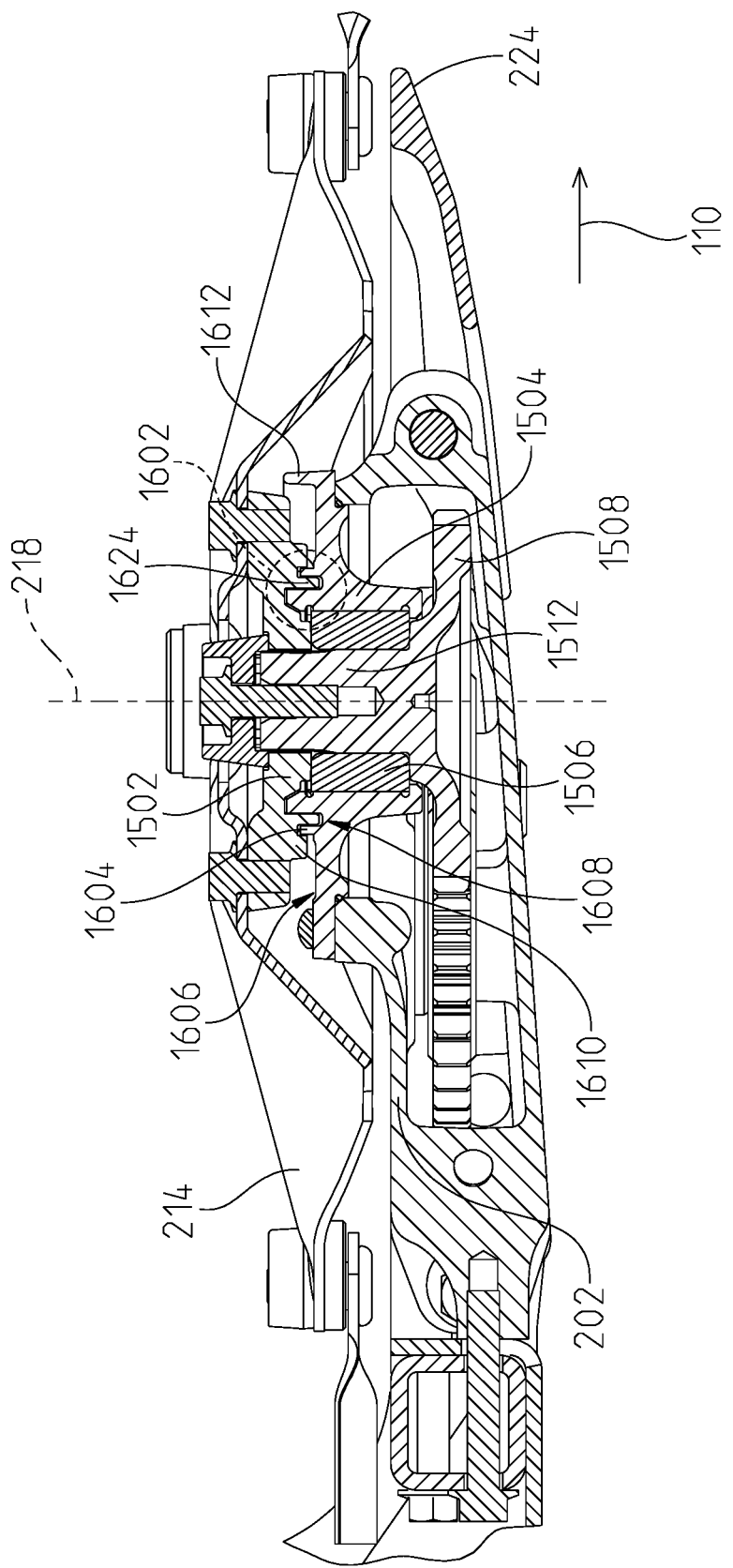
FIG. 16a is a section view of the disk hub assembly positioned within the cutterbar assembly.

Now referring to FIG. 16*a*, a cross-section view of the disk hub assembly 212 is shown with the disk hub assembly 212 coupled to the housing 202 and the cutting disk 214. More specifically shown in FIG. 16*a* is a labyrinth 1602 defined in the disk hub 1502 and the bearing housing 1504 circumferentially about the disk axis 218. The labyrinth 1602 may be a plurality of rings, passages, channels or grooves defined between the disk hub 1502 and the bearing housing 1504. The labyrinth 1602 may be shaped to allow the disk hub 1502 to rotate without substantially contacting the bearing housing 1504 while also substantially restricting debris from passing through the labyrinth 1602 and becoming disposed proximate to the bearing 1506.

In one non-exclusive example of the labyrinth 1602, the bearing housing 1504 may have an annular ring 1604 defined circumferentially about the disk axis 218 and that extends axially away from a bearing housing surface 1606. Correspondingly, the disk hub 1502 may have a circumferentially defined channel disposed axially adjacent to the raised annular ring 1604 of the bearing housing 1504.

Radially inward of the raised annular ring 1604 may be a first recessed annular groove 1608 defined within the bearing housing 1504. The recessed annular groove 1608 may be a groove defined circumferentially about the disk axis 218 and recessed axially into the bearing housing surface 1606 towards the pinion gear 1508. The disk hub 1502 may also have a corresponding third annular ring 1624 that may be substantially positioned within the recessed annular groove 1608.

Figure 17:
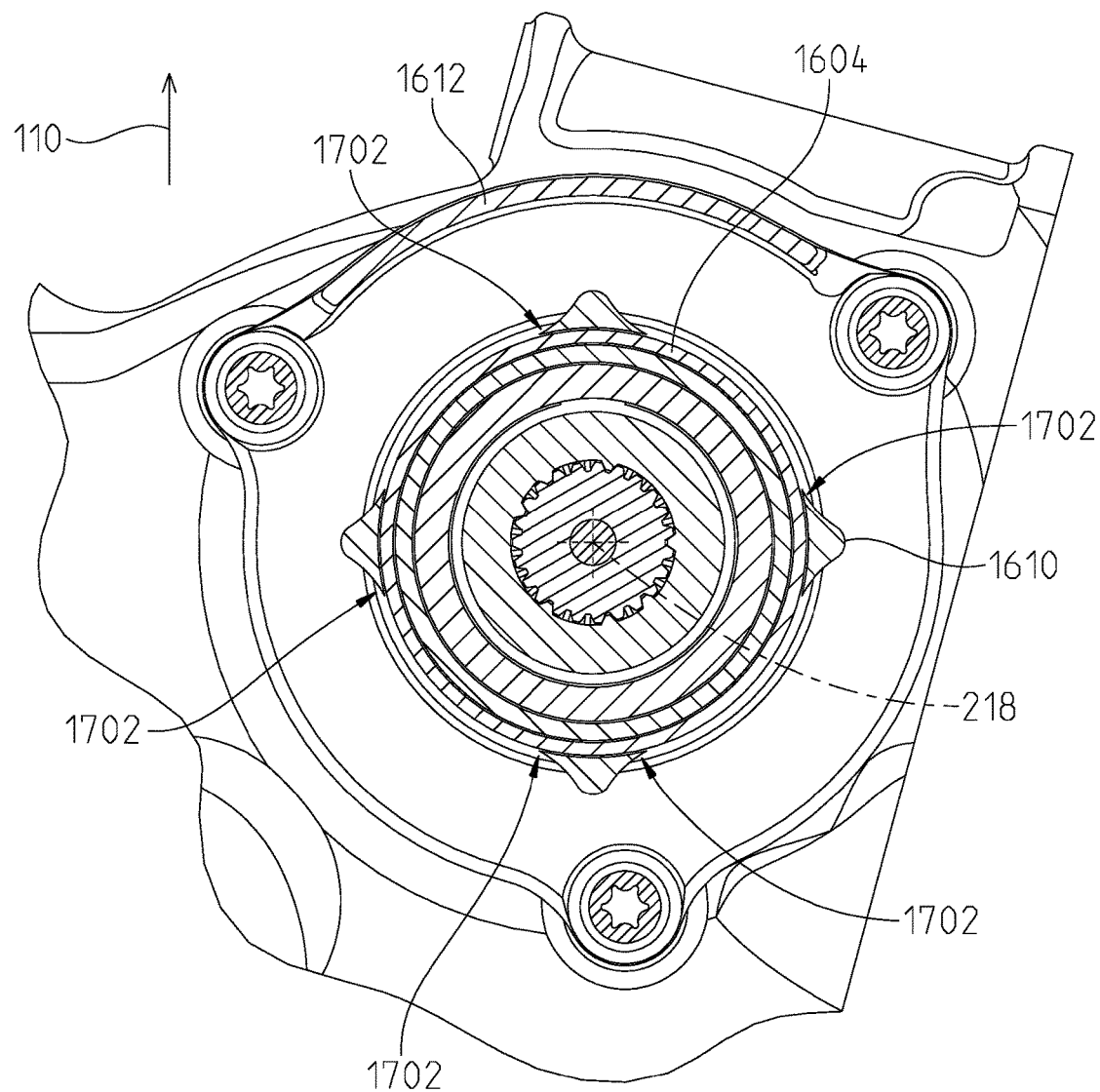
FIG. 17 is a top section view of the disk hub assembly positioned within the cutterbar assembly.

A wedge-shaped protrusion 1610 may be defined by the disk hub 1502 at a radially outermost portion of the labyrinth 1602. More specifically, as shown in FIG. 16*a*, the wedge-shaped protrusion 1610 may be radially adjacent to the raised annular ring 1604. Further, as shown in FIG. 17, the wedge-shaped protrusion 1610 may have a leading edge 1702 that substantially severs any debris that may become positioned proximate to the labyrinth 1602. In this embodiment, not only does the labyrinth 1602 substantially restrict debris from passing therethrough and contaminating the bearing 1506, the wedge-shape protrusion 1610 may also rotate with the disk hub 1502 and thereby sever any fibrous debris that may become positioned along the raised annular ring 1604.

Yet another aspect of the embodiment shown in FIG. 16*a* may include a debris diverter or barrier 1612 integrally formed by the bearing housing 1504. The diverter or barrier 1612 may be arc-shaped and extend in a direction substantially parallel to the disk axis and away from the bearing housing surface 1606. As shown, the barrier 1612 may be disposed towards the front edge 206. The barrier 1612 is shown as being arc-shaped, but in other embodiments it may be wedge-shaped or include any known type of shape. In operation, the barrier 1612 may be positioned and sized to substantially restrict debris from becoming disposed proximate to the labyrinth 1602. More specifically, as the cutter-bar assembly 200 travels in the harvest direction 110, the cutting disk 214 may rotate the knives 216 coupled thereto. As the knives 216 rotate and the work machine 100 travels in the harvesting direction 110, crop or other debris may become positioned between the cutting disk 214 and the housing 202. Under these circumstances, the barrier 1612 may substantially block or divert the crop or debris from passing thereover and becoming disposed proximate to or within the labyrinth 1602. Accordingly, the barrier 1612, the labyrinth 1602, and the wedge-shaped protrusion 1610 may each substantially restrict debris from becoming disposed within or around the bearing 1506.

Referring now to 16*b*, the corresponding labyrinths 1602 are shown and described in more detail. More specifically shown in FIG. 16*b* may be the radial disposition of some of the features of the corresponding labyrinths 1602. In one non-limiting example, the first annular ring 1604 may be circumferentially disposed about the disk axis 218 at a first radius 1614 therefrom. The first annular ring 1604 may extend axially away from the bearing housing surface 1606 as described above. The first recessed annular groove 1608 may also be defined in the bearing housing 1504 and be radially inward of the first annular ring 1604. The first recessed annular groove 1608 may be defined at a second radius 1616 about the disk axis 218, the second radius 1616 being less than the first radius 1614.

A second annular ring 1618 may also be defined in the bearing housing 1504. The second annular ring 1618 may extend away from the bearing housing surface 1606 in a similar way as described above for the first annular ring 1604. However, the second annular ring 1618 may be circumferentially defined in the bearing housing 1504 at a third radius 1620 from the disk axis 218, the third radius 1620 being less than the second radius 1616.

As described above, the disk hub 1502 may have features that correspond with the first annular ring 1604, the first recessed annular groove 1608, and the second annular ring 1618 defined in the bearing housing 1504. In one non-limiting example, a second recessed annular groove 1622 may be defined in the disk hub 1502 at the third radius 1620. The second recessed annular groove 1622 may correspond inversely with the second annular ring 1618 of the bearing housing 1504. In other words, the second annular groove 1622 receives a portion of the second annular ring 1618 therein when the disk hub 1502 is positioned axially adjacent to the bearing housing 1504 as shown in FIG. 16*b*.

Similarly, a third annular ring 1624 may be defined circumferentially about the disk axis 218 within the disk hub 1502. The third annular ring 1624 may be spaced by the second radius 1616 from the disk axis 218 and correspond with the first recessed annular groove 1608 of the bearing housing 1504. More specifically, the third annular ring 1624 of the disk hub 1502 may be sized and shaped to substantially fill the first annular groove 1608 of the bearing housing 1504 when the disk hub 1502 is coupled adjacent to the bearing housing 1504.

Figure 16B:
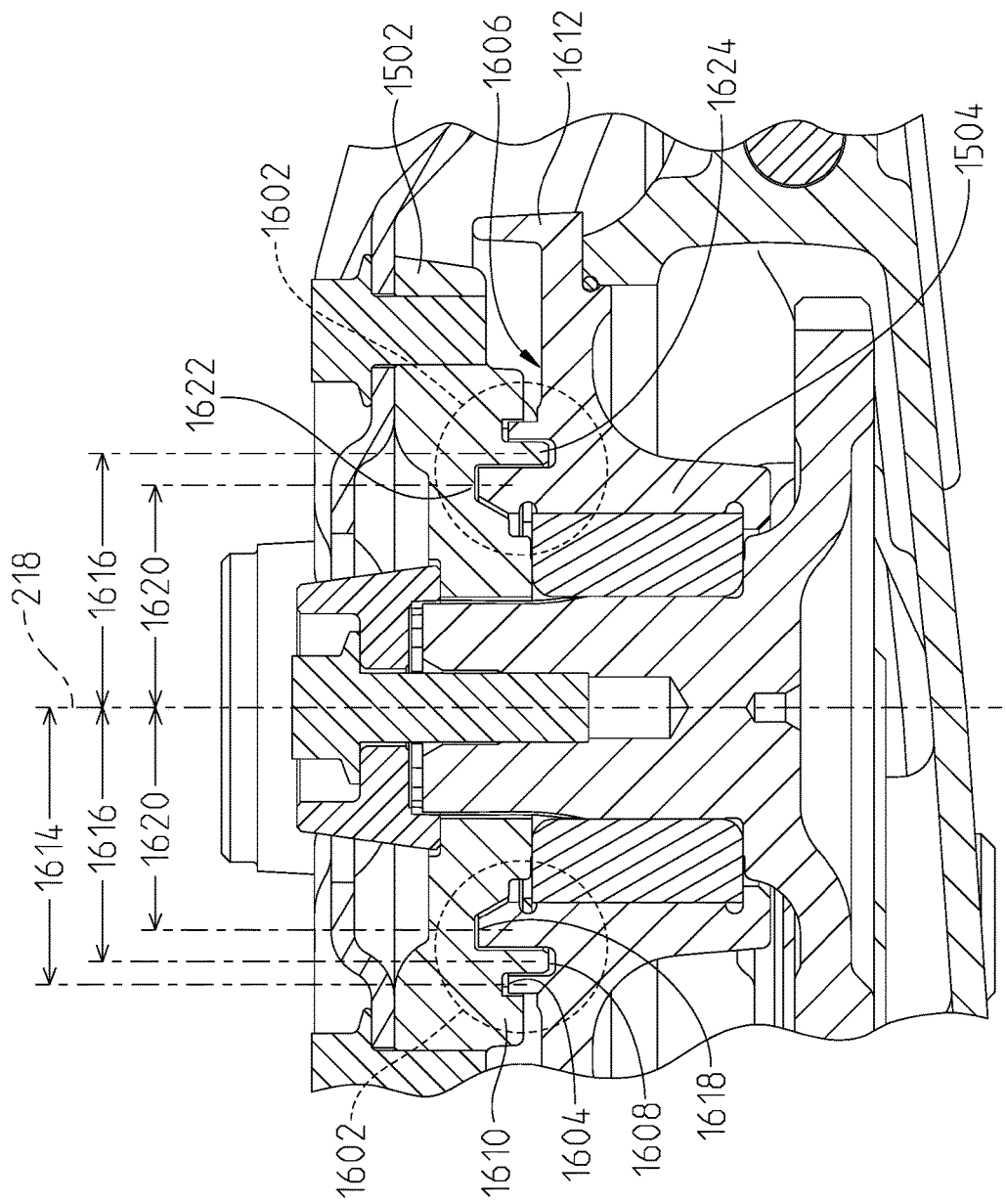

The labyrinth 1602 shown and described above identifies a specific number of raised annular rings and recessed annular grooves, but this disclosure is not limited to any particular number or configuration as shown in FIGS. 16a-16b. Any number of corresponding rings and grooves can be defined between the bearing housing 1504 and the disk hub 1502. In one embodiment, there may be one raised annular ring defined in either the disk hub 1502 or the bearing housing 1504 and one corresponding annular groove 1608 defined in either the disk hub 1502 or the bearing housing 1504. In yet another embodiment, there may be more than one annular ring defined between the disk hub 1502 and the bearing housing 1504. Accordingly, this disclosure is not limited to any particular number of rings and corresponding grooves defined in the labyrinth 1602.

Now referring to FIG. 17, a partial section view of the disk hub assembly 212 is shown. In this non-exclusive embodiment, a leading edge 1702 is shown on the wedge-shaped protrusion 1610. The leading edge 1702 may be positioned on the portion of the wedge-shaped protrusion 1610 that leads as it rotates about the disk axis 218. Further, in one embodiment the leading edge 1702 may be defined on either side of the wedge-shaped protrusion 1610. In this embodiment, a leading edge 1702 may sever any debris disposed thereby regardless of the rotational direction of the disk hub 1502.

In addition to severing debris with the leading edge 1702, the wedge-shaped protrusion 1610 may be shaped to dispel debris positioned thereby away from the bearing 1506. More specifically, the wedge-shape may initially contact and sever debris at the leading edge 1702, then the debris may be forced radially away from the disk axis 218 as it travels along the wedge-shaped protrusion 1610 as it extends radially away from the disk axis 218.

Another aspect of the embodiment shown in FIG. 17 may be the spacing between the annular ring 1604 and the arc-shaped barrier 1612. In one non-limiting example, debris may become positioned between the annular ring 1604 and the barrier 1612. As the disk hub 1502 rotates the wedge-shaped protrusions 1610, the debris disposed between the barrier 1612 and the annular ring 1604 may be forced away from the disk axis 218 as described above but substantially restricted from being ejected in the harvest direction 110. More specifically, the barrier 1612 may restrict debris from becoming positioned adjacent to the annular ring 1604 while simultaneously restricting debris from being emitted by the wedge-shaped protrusion 1610 towards the harvest direction 110.

While the wedge-shaped portion 1610 has been shown and described as being wedge-shaped and having a leading edge, this disclosure is not limited to that particular shape. In one non-exclusive embodiment, this feature may not be wedge-shaped. Rather, it may be formed as a blade or other sharp feature that can cut through debris. Accordingly, this disclosure is not limited to any particular shape of the wedge-shaped protrusion shown and described above.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A modular cutterbar assembly operably coupled to a work machine, comprising:
   at least one module;
   an end cap coupled to the at least one module, the end cap having an upper surface defined between a first end and a second end;
   an inner cavity defined in the first end of the end cap, the inner cavity configured to substantially enclose a drive transfer mechanism;
   an aperture defined in the upper surface;
   a coupler arm integrally formed with the second end of the end cap, the coupler arm configured to be coupled to the work machine; and
   a disk hub assembly disposed in the aperture and configured to rotate a first cutting disk, wherein the disk hub assembly is only coupled to the end cap.

2. The modular cutterbar assembly of claim 1, wherein the at least one module is coupled to the first end of the end cap along a joint.

3. The modular cutterbar assembly of claim 1, further comprising a disk guard coupled to the end cap, wherein a tab formed by the end cap is coupled to the disk guard, and wherein the disk guard spans a joint formed between the end cap and a first module of the at least one module.

4. The modular cutterbar assembly of claim 3, wherein the first module forms a second tab, the second tab coupled to the disk guard.

5. The modular cutterbar assembly of claim 1, wherein the at least one module is coupled to the end cap at a first coupler location along a front edge thereof and at a second coupler location along a rear edge.

6. The modular cutterbar assembly of claim 5, wherein the at least one module is coupled to the end cap at a third coupler location which extends from the upper surface and is positioned between the first and second coupler locations.

7. The modular cutterbar assembly of claim 1, wherein the at least one module defines an inner cavity, the inner cavity of the at least one module being fluidly coupled with the inner cavity defined by the end cap.

8. The modular cutterbar assembly of claim 1, further comprising:
   a second end cap forming an upper surface and being disposed on a side of the at least one module opposite the end cap;
   an inner cavity defined in the second end cap, the inner cavity configured to substantially enclose a drive transfer mechanism;
   a second aperture defined in the upper surface of the second end cap; and
   a second coupler arm integrally formed with the second end cap, the second coupler arm configured to be coupled to the work machine.

9. The modular cutterbar assembly of claim 8, wherein:
   the at least one module comprises a first module and a second module coupled to one another;

the end cap being coupled to the first module along a first joint, the end cap coupled to a side of the first module opposite the second module; and the second end cap being coupled to the second module along a second joint, the second end cap coupled to a side of the second module opposite the first module.

10. A cutterbar assembly configured for use with a work machine, the cutterbar assembly comprising:

a plurality of modules wherein adjacent modules are coupled to one another along a cutterbar axis, each module partially defining an inner cavity that extends along the cutterbar axis, wherein a drive transfer mechanism is housed in the inner cavity;

a first end cap coupled to a first module of the plurality of modules along the cutterbar axis, the first end cap comprising:

a first closed end of the inner cavity defined by the first end cap, the first closed end of the inner cavity housing a first end of the drive transfer mechanism;

a first aperture defined in an upper surface of the first end cap;

a first rim defined by the upper surface of the first end cap and circumferentially surrounding the first aperture; and a first coupler arm integrally formed with the first end cap, the first coupler arm configured to be coupled to the work machine;

a second end cap coupled to a second module of the plurality of modules along the cutterbar axis, the second end cap comprising:

a second closed end of the inner cavity defined by the second end cap, the second enclosed end of the inner cavity housing a second end of the drive transfer mechanism;

a second aperture defined in an upper surface of the second end cap;

a second rim defined by the upper surface of the second end cap and circumferentially surrounding the second aperture; and a second coupler arm integrally formed with the second end cap, the second coupler arm configured to be coupled to the work machine.

11. The cutterbar assembly of claim 10, wherein the first end cap is coupled to the first module along a first joint, and the second end cap is coupled to the second module along a second joint.

12. The cutterbar assembly of claim 10, further comprising:

a first disk hub assembly disposed in the first aperture and configured to rotate a first cutting disk; and a second disk hub assembly disposed in the second aperture and configured to rotate a second cutting disk.

13. The cutterbar assembly of claim 10, wherein the first module is coupled to the first end cap at a first coupler location along a front edge, at a second coupler location along a rear edge, and at a third coupler location disposed between the first and second coupler locations.

14. The cutterbar assembly of claim 11, wherein the first joint and the second joint are oblique relative to the cutterbar axis.

15. The cutterbar assembly of claim 10, wherein the first aperture is defined entirely by the first end cap, and wherein the second aperture is defined entirely by the second end cap.

16. The cutterbar assembly of claim 10, wherein a first module of the plurality of modules is coupled to the first end cap such that a joint is formed therebetween, and wherein a disk guard is coupled to the first end cap and the first module such that the disk guard crosses the joint.

17. A tractor assembly, comprising:

a work machine having a chassis, at least one ground engaging mechanism coupled to the chassis, and a prime mover coupled to the chassis for generating power to drive the at least one ground engaging mechanism;

a modular cutterbar assembly comprising a plurality of modules disposed along a cutterbar axis, the modular cutterbar assembly including at least a first module and a second module;

a first end cap coupled to the first module, the first end cap comprising:

a first inner cavity defined by the first end cap, the first inner cavity configured to substantially enclose a first portion of a drive transfer mechanism;

a first aperture defined in an upper surface of the first end cap; and a first coupler arm integrally formed with the first end cap, the first coupler arm coupled to the work machine;

a second end cap coupled to the second module opposite the first end cap, the second end cap comprising:

a second coupler arm integrally formed with the second end cap, the second coupler arm coupled to the work machine;

a first disk hub assembly disposed in the first aperture and engaged with the first portion of the drive transfer mechanism, wherein the first disk hub assembly is mounted to the first end cap and not to the first module.

18. The tractor assembly of claim 17, wherein the first end cap is coupled to the first module along a first joint, the second end cap is coupled to the second module along a second joint, and the first joint and the second joint extend obliquely relative to the cutterbar axis.

19. The tractor assembly of claim 17, wherein the first end cap forms a first tab, the second end cap forms a second tab, and the first module forms a third tab, further comprising one or more disk guards coupled to the first, second, and third tabs such that each disk guard spans a corresponding and respective joint formed between two adjacent components.

20. The tractor assembly of claim 17, further comprising a disk guard coupled to the first end cap and to the first module such that the disk guard spans a joint defined between the first end cap and the first module.

* * * * *